US011032756B2

(12) United States Patent
Sun et al.

(10) Patent No.: US 11,032,756 B2
(45) Date of Patent: Jun. 8, 2021

(54) BINARY TREE BASED PDCCH SEARCH SPACE DESIGN

(71) Applicant: QUALCOMM Incorporated, San Diego, CA (US)

(72) Inventors: Jing Sun, San Diego, CA (US); Tao Luo, San Diego, CA (US); Heechoon Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 252 days.

(21) Appl. No.: 15/928,928

(22) Filed: Mar. 22, 2018

(65) Prior Publication Data

US 2018/0279210 A1    Sep. 27, 2018

Related U.S. Application Data

(60) Provisional application No. 62/476,207, filed on Mar. 24, 2017.

(51) Int. Cl.
*H04W 48/12* (2009.01)
*H04W 72/04* (2009.01)
(Continued)

(52) U.S. Cl.
CPC .......... *H04W 48/12* (2013.01); *H04L 5/0053* (2013.01); *H04L 25/0238* (2013.01); *H04W 72/042* (2013.01); *H04W 72/14* (2013.01)

(58) Field of Classification Search
CPC ... H04W 48/12; H04W 72/14; H04W 72/042; H04L 25/0238
See application file for complete search history.

(56) References Cited

U.S. PATENT DOCUMENTS

2008/0304588 A1\* 12/2008 Pi ......................... H04W 72/00
375/260
2008/0307221 A1\* 12/2008 Horita .................... G06Q 30/06
713/156

(Continued)

OTHER PUBLICATIONS

International Search Report and Written Opinion—PCT/US2018/024164—ISA/EPO—Jul. 3, 2018(173278WO).

(Continued)

*Primary Examiner* — Walli Z Butt
*Assistant Examiner* — Thad N Defauw
(74) *Attorney, Agent, or Firm* — Qualcomm Incorporated

(57) ABSTRACT

A method and apparatus for enhancing channel estimation by using a binary tree based PDCCH search space in a new radio wireless communication system is disclosed. For example, a UE may identify an aggregation level profile having an aggregation level value for one or more aggregation levels, wherein each aggregation level corresponds to a respective number of resources to use for decoding a PDCCH, determine one or more decoding candidates for the UE from among a plurality of available decoding candidates defined as nodes in a binary tree for a search space based on the aggregation level profile, determine respective CCEs corresponding to each of the one or more decoding candidates, each respective CCE including one or more REGs, and performing channel estimation for each of the respective CCEs for use in demodulating and decoding downlink control information for the UE in the PDCCH.

30 Claims, 22 Drawing Sheets

(51) Int. Cl.
    *H04L 25/02*     (2006.01)
    *H04L 5/00*     (2006.01)
    *H04W 72/14*     (2009.01)

(56) References Cited

U.S. PATENT DOCUMENTS

| | | | |
|---|---|---|---|
| 2011/0273996 A1* | 11/2011 | Kim | H04J 11/0069 370/242 |
| 2012/0051270 A1* | 3/2012 | Chen | H04B 7/155 370/279 |
| 2014/0314040 A1* | 10/2014 | Wang | H04W 72/1273 370/329 |
| 2018/0183774 A1* | 6/2018 | Campagna | H04L 63/067 |
| 2019/0268208 A1* | 8/2019 | Seo | H04L 5/0053 |

OTHER PUBLICATIONS

QUALCOMM Incorporated: "Control Resource Set and Search Space," 3GPP Draft; R1-1716414 Control Resource Set and Search Space, 3rd Generation Partnership Project (3GPP), Mobile Competence Centre; 650, Route des Lucioles; F-06921 Sophia-Antipolis Cedex; France, vol. RAN WG1, No. Nagoya, Japan; 20170918-20170921, Sep. 17, 2017 (Sep. 17, 2017), XP051339869, 8 pages, Retrieved from the Internet: URL:http://www.3gpp.org/ftp/Meetings_3GPP_SYNC/RAN1/Docs/ [retrieved on Sep. 17, 2017].
Samsung: "Configuration of PDCCH candidate sets for the control of blind decoding attempts", 3GPP Draft; R1-080675, 3rd Generation Partnership Project (3GPP), Mobile Competence Centre ; 650, Route des Lucioles ; F-06921 Sophia- Antipolis Cedex ; France, vol. RAN WG1, No. Sorrento, Italy; 20080211-20080215, Feb. 5, 2008 (Feb. 5, 2008), XP050596641, [retrieved on Feb. 5, 2008].

\* cited by examiner

BINARY TREE BASED PDCCH SEARCH SPACE DESIGN

CROSS-REFERENCE TO RELATION APPLICATIONS

The present Application for Patent claims priority to U.S. Provisional Application No. 62/476,207 entitled "BINARY TREE BASED PDCCH SEARCH SPACE DESIGN" filed Mar. 24, 2017, which is assigned to the assignee hereof and hereby expressly incorporated by reference herein.

BACKGROUND

Aspects of the present disclosure relate generally to wireless communication networks, and more particularly, to a binary tree based Physical Downlink Control Channel (PDCCH) search space design in a new radio wireless communication system.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, improvements in blind decoding and channel estimation may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method includes blind decoding and channel estimation during wireless communications. The described aspects include identifying, at a user equipment (UE), an aggregation level profile having an aggregation level value for one or more aggregation levels, wherein each aggregation level corresponds to a respective number of resources to use for decoding a physical downlink control channel (PDCCH). The described aspects further include determining one or more decoding candidates for the UE from among a plurality of available decoding candidates defined as nodes in a binary tree for a search space based on the aggregation level profile. The described aspects further include determining respective control channel elements (CCEs) corresponding to each of the one or more decoding candidates, each respective CCE including one or more resource element groups (REGs). The described aspects further include performing channel estimation for each of the respective CCEs for use in demodulating and decoding downlink control information for the UE in the PDCCH.

In an aspect, an apparatus (e.g., a UE) for blind decoding and channel estimation during wireless communications may include a transceiver, a memory; and at least one processor coupled to the memory and configured to identify an aggregation level profile having an aggregation level value for one or more aggregation levels, wherein each aggregation level corresponds to a respective number of resources to use for decoding a PDCCH. The described aspects further determine one or more decoding candidates for the UE from among a plurality of available decoding candidates defined as nodes in a binary tree for a search space based on the aggregation level profile. The described aspects further determine respective CCEs corresponding to each of the one or more decoding candidates, each respective CCE including one or more REGs. The described aspects further perform channel estimation for each of the respective CCEs for use in demodulating and decoding downlink control information for the UE in the PDCCH.

In an aspect, a computer-readable medium storing computer executable code for blind decoding and channel estimation during wireless communications is described. The described aspects include code for identifying, at a UE, an aggregation level profile having an aggregation level value for one or more aggregation levels, wherein each aggregation level corresponds to a respective number of resources to use for decoding a PDCCH. The described aspects further include code for determining one or more decoding candidates for the UE from among a plurality of available decoding candidates defined as nodes in a binary tree for a search space based on the aggregation level profile. The described aspects further include code for determining respective CCEs corresponding to each of the one or more decoding candidates, each respective CCE including one or more REGs. The described aspects further include code for performing channel estimation for each of the respective CCEs for use in demodulating and decoding downlink control information for the UE in the PDCCH.

In an aspect, an apparatus for blind decoding and channel estimation during wireless communications is described. The described aspects include means for identifying, at a UE, an aggregation level profile having an aggregation level value for one or more aggregation levels, wherein each aggregation level corresponds to a respective number of resources to use for decoding a PDCCH. The described aspects further include means for determining one or more decoding candidates for the UE from among a plurality of available decoding candidates defined as nodes in a binary tree for a search space based on the aggregation level profile.

The described aspects further include means for determining respective CCEs corresponding to each of the one or more decoding candidates, each respective CCE including one or more REGs. The described aspects further include means for performing channel estimation for each of the respective CCEs for use in demodulating and decoding downlink control information for the UE in the PDCCH.

In accordance with an aspect, a method includes blind decoding and channel estimation during wireless communications. The described aspects include determining, at a network entity, an aggregation level profile having an aggregation level value for one or more aggregation levels for a UE, wherein each aggregation level corresponds to a respective number of resources to use for decoding a PDCCH. The described aspects further include transmitting the aggregation level profile and a randomized seed to the UE, the randomized seed being associated with the UE and including one or more parameters to synchronize the generation of a random number value by UE and the network entity. The described aspects further include determining a search space for the UE to locate one or more PDCCHs, the search space including a plurality of CCEs. The described aspects further include selecting one or more decoding candidates using a binary tree procedure based at least on the aggregation level profile, each decoding candidate corresponding to one of plurality the CCEs. The described aspects further include transmitting a grant including one or more PDCCHs to the UE on the one or more selected decoding candidates, each of the PDCCHs being located in one of the plurality of CCEs corresponding to the one or more selected decoding candidates.

In an aspect, an apparatus for blind decoding and channel estimation during wireless communications may include a transceiver, a memory; and at least one processor coupled to the memory and configured to determine, at a network entity, an aggregation level profile having an aggregation level value for one or more aggregation levels for a UE, wherein each aggregation level corresponds to a respective number of resources to use for decoding a PDCCH. The described aspects further transmit the aggregation level profile and a randomized seed to the UE, the randomized seed being associated with the UE and including one or more parameters to synchronize the generation of a random number value by UE and the network entity. The described aspects further determine a search space for the UE to locate one or more PDCCHs, the search space including a plurality of CCEs. The described aspects further select one or more decoding candidates using a binary tree procedure based at least on the aggregation level profile, each decoding candidate corresponding to one of plurality the CCEs. The described aspects further transmit a grant including one or more PDCCHs to the UE on the one or more selected decoding candidates, each of the PDCCHs being located in one of the plurality of CCEs corresponding to the one or more selected decoding candidates.

In an aspect, a computer-readable medium storing computer executable code for blind decoding and channel estimation during wireless communications is described. The described aspects include code for determining, at a network entity, an aggregation level profile having an aggregation level value for one or more aggregation levels for a UE, wherein each aggregation level corresponds to a respective number of resources to use for decoding a PDCCH. The described aspects further include code for transmitting the aggregation level profile and a randomized seed to the UE, the randomized seed being associated with the UE and including one or more parameters to synchronize the generation of a random number value by UE and the network entity. The described aspects further include code for determining a search space for the UE to locate one or more PDCCHs, the search space including a plurality of CCEs. The described aspects further include code for selecting one or more decoding candidates using a binary tree procedure based at least on the aggregation level profile, each decoding candidate corresponding to one of plurality the CCEs. The described aspects further include code for transmitting a grant including one or more PDCCHs to the UE on the one or more selected decoding candidates, each of the PDCCHs being located in one of the plurality of CCEs corresponding to the one or more selected decoding candidates.

In an aspect, an apparatus for blind decoding and channel estimation during wireless communications is described. The described aspects include means for determining, at a network entity, an aggregation level profile having an aggregation level value for one or more aggregation levels for a UE, wherein each aggregation level corresponds to a respective number of resources to use for decoding a PDCCH. The described aspects further include means for transmitting the aggregation level profile and a randomized seed to the UE, the randomized seed being associated with the UE and including one or more parameters to synchronize the generation of a random number value by UE and the network entity. The described aspects further include means for determining a search space for the UE to locate one or more PDCCHs, the search space including a plurality of CCEs. The described aspects further include means for selecting one or more decoding candidates using a binary tree procedure based at least on the aggregation level profile, each decoding candidate corresponding to one of plurality the CCEs. The described aspects further include means for transmitting a grant including one or more PDCCHs to the UE on the one or more selected decoding candidates, each of the PDCCHs being located in one of the plurality of CCEs corresponding to the one or more selected decoding candidates.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
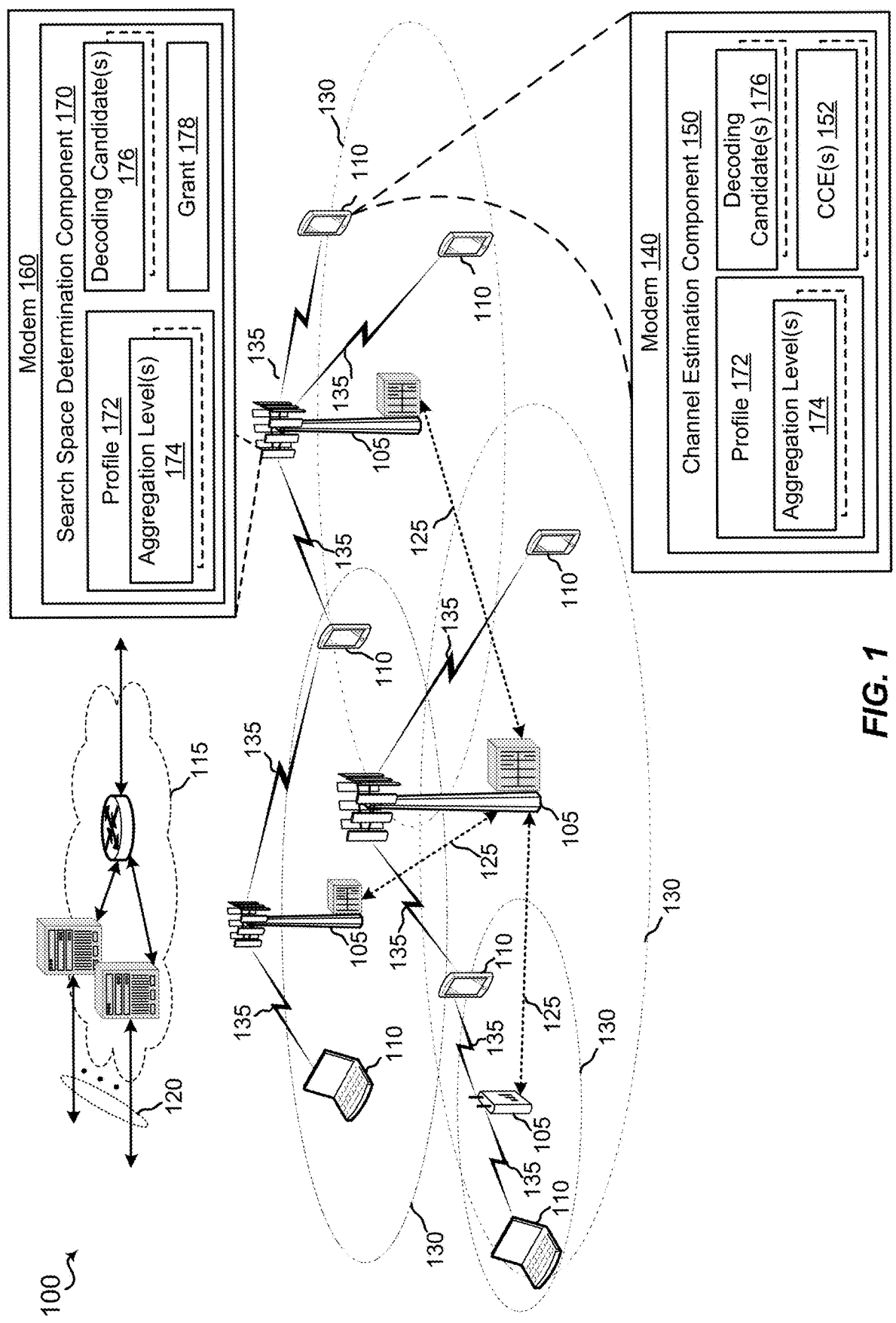
FIG. 1 is a schematic diagram of a wireless communication network including at least one base station having a search space determination component configured to determine and transmit an aggregation level profile associated with a UE and at least one UE having a channel estimation component configured to perform channel estimation by using a binary tree based PDCCH search space.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to a binary tree based physical downlink control channel (PDCCH) search space design in a new radio wireless communication system, which may be used to enhance blind decoding (BD) and channel estimation. In an example, for one UE, the channel estimate obtained for one resource element (RE) should be reusable across multiple BDs involving that RE in at least the same control resource set (CORESET) and type of search space (common or UE-specific). Further, using the binary tree based PDCCH search space design described herein, the maximum number of BD candidates for a UE may be defined independently of the number of control resource sets and the number of search spaces.

In order to achieve this, the binary tree based PDCCH search space design may be configured for localized or distributed mapping of resource element groups (REGs) to a control channel element (CCE), or localized mapping of REGs to a CCE. For example, the binary tree based PDCCH search space design may be configured for localized or distributed mapping of CCEs when multiple CCEs are needed for an NR-PDCCH.

In an aspect, a CORESET is formed by a set of REGs. In some cases, the set of REGs may be a continuous set or REGs. Further, the CORESET may include REGs embedded with DMRS only (e.g., DMRS will only be inserted in REGs used). DMRS may be beam formed towards a UE, or UE specific (without considering shared reference signal (RS)). Moreover, a search space is defined for a UE in the CORESET. For example, a search space is formed by a profile of decode candidates of different aggregation levels (ALs) (e.g., 4 AL1+4 AL2+2 AL4+2 ALB, etc.). The network (e.g., a base station or gNB) may send PDCCH in one or more of the decoding candidates to the UE. The UE needs to try decoding all the decoding candidates for potential downlink control information (DCI). According to the binary tree based PDCCH search space design, the UE may share channel estimation for a REG among different decoding candidates sharing the same REG. Further, the REG may be involved in different decoding candidates, possibly with different aggregation levels.

The binary tree based PDCCH search space design described herein may have a low complexity and enhanced blind decoding and/or channel estimation performance. For example, a UE operating according to the present aspects may perform one channel estimation per REG. Additionally, in some cases, the bundling size of channel estimation may be as large as possible since larger bundling typically leads to better channel estimation when the precoding/beamforming is continuous within the bundle. Therefore, the present aspects may include one or more of a localized search space (CCE to REG mapping+localized PDCCH to CCE mapping) with embedded DMRS, a distributed search space with embedded DMRS, and a distributed search space with wideband DMRS.

Further, the present aspects define the resources in a binary tree and define PDCCH resource as nodes in the binary tree. A hashing procedure may be defined on the binary tree to maximize REG reuse in the search space. The reuse is reflected in reuse of channel estimation and reuse of logarithm likelihood ratio (LLR) computation. For the embedded DMRS case, channel estimation may be further optimized by opportunistically larger bundling size, when beamforming or smooth precoder cycling (or small cell dynamic deployment (SCDD); e.g., when the precoding vector does not change) is used. The binary tree structure is configured for the case when there are $2^N$ resources. Since it may be difficult to restrict the NR control resource set allocation to satisfy that requirement, the design also considers other CORESET sizes by introducing some wrap-around concepts on the binary tree.

In an implementation at the network (e.g., gNB), according to one example, a method of wireless communication may include determining an aggregation level profile having an aggregation level value for one or more aggregation levels for a UE, wherein each aggregation level corresponds to a respective number of resources to use for decoding a PDCCH. The method may further include transmitting the aggregation level profile and a randomized seed to the UE, the randomized seed being associated with the UE and including one or more parameters to synchronize the generation of a random number value by UE and the network entity. The method may further include determining a search space for the UE to locate one or more PDCCHs, the search space including a plurality of CCEs. The method may further include selecting one or more decoding candidates for the UE from among a plurality of available decoding candidates defined as nodes in a binary tree for the search space based on the aggregation level profile, and transmitting a downlink control information (DCI) (such as a grant) in one or more PDCCHs to the UE on the one or more decoding candidates, each of the PDCCHs being located in one of the plurality of CCEs corresponding to the one or more decoding candidates.

In an implementation at a UE, an example method of wireless communications includes identifying, at the UE, an aggregation level profile having an aggregation level value for one or more aggregation levels, wherein each aggregation level corresponds to a respective number of resources to use for decoding a PDCCH. Additionally, the method includes determining one or more decoding candidates for the UE from among a plurality of available decoding candidates defined as nodes in a binary tree for a search space based on the aggregation level profile. The method further includes determining respective CCEs corresponding to each of the one or more decoding candidates, each respective CCE including one or more REGs. Additionally, the method further includes performing channel estimation for each of the respective CCEs for use in demodulating and decoding downlink control information for the UE in the PDCCH.

Additional features of the present aspects are described in more detail below with respect to FIGS. 1-22.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a channel estimation component 150 that performs channel estimation by using a binary tree based PDCCH search space in a new radio wireless communication system. Further, wireless communication network 100 includes at least one base station 105 with a modem 160 having a search space determination component 170 that enables transmissions on a communication channel (e.g., communications link 135), such as transmitting an aggregation level profile 172 and a grant 178 to UE 110.

In an aspect, base station 105 may execute search space determination component 170 to determine an aggregation level profile 172 having an aggregation level value for one or more aggregation levels 174 for a UE 110, wherein each aggregation level 174 corresponds to a respective number of resources to use for decoding a PDCCH. The base station 105 and/or search space determination component 170 may transmit the aggregation level profile 172 and a randomized seed to the UE 110, the randomized seed being associated with the UE 110 and including one or more parameters to synchronize the generation of a random number value by UE 110 and the network entity 105. The base station 105 may execute search space determination component 170 to determine a search space for the UE 110 in which to locate one or more PDCCHs, the search space including a plurality of CCEs 152. The base station 105 may execute search space determination component 170 to select one or more decoding candidates 176 for the UE 110 using a binary tree procedure based at least on the aggregation level profile 172, each decoding candidate 176 corresponding to one of plurality the CCEs 152. The base station 105 may execute search space determination component 170 to transmit a grant 178 in one or more PDCCHs to the UE 110 on the one or more decoding candidates 176, each of the PDCCHs being located in one of the plurality of CCEs 152 corresponding to the one or more decoding candidates 176.

In an aspect, UE 110 may execute channel estimation component 150 to identify an aggregation level profile 172 having an aggregation level value for one or more aggregation levels 174, wherein each aggregation level 174 corresponds to a respective number of resources to use for decoding a PDCCH. The UE 110 may execute channel estimation component 150 to determine one or more decoding candidates 176 for the UE from among a plurality of available decoding candidates 176 defined as nodes in a binary tree for a search space based on the aggregation level profile. The UE 110 may execute channel estimation component 150 to determine respective CCEs 152 corresponding to each of the one or more decoding candidates 176, each respective CCE including one or more REGs. The UE 110 may execute channel estimation component 150 to perform channel estimation for each of the respective CCEs 152 for use in demodulating and decoding downlink control information for the UE 110 in the PDCCH.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave or MMW) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
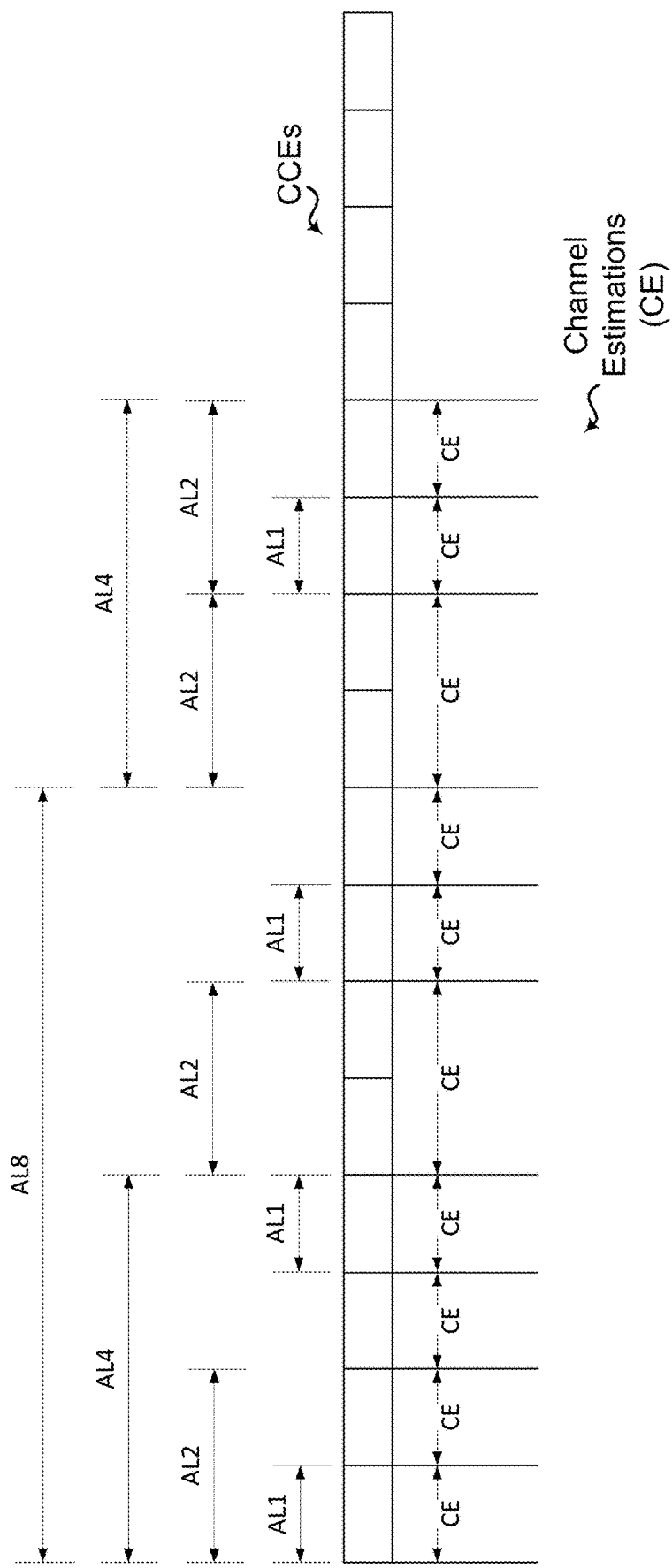
FIG. 2 is a conceptual diagram of an example localized search space design that utilizes at least some groups of resources based on overlapping candidates of a plurality of aggregation levels for performing channel estimation.

Referring to FIG. 2, a conceptual diagram of an example localized search space design 200 based on an aggregation profile having a plurality of aggregation levels may include grouping two or more CCEs for performing channel estimation based on the techniques described herein. For example, UE 110 may execute channel estimation component 150 based on the binary tree design and hashing procedure described herein to determine one or more decoding candidates 176 (FIG. 1) for the UE 110 from among a plurality of available decoding candidates defined as nodes at different aggregation levels in the binary tree for a search space based on the aggregation level profile 172.

In this example of the localized search space design 200, the aggregation level profile of (4, 4, 2, 1) is described. The aggregation level profile corresponds to 4 AL1, 4 AL2, 2 AL4, and 1 AL8. The location of different aggregation level decoding candidates are not optimized. By applying the boundaries of all decoding candidates, 8 channel estimations exist with 1 CCE, and 2 channel estimations exist with 2 CCE. The results of these channel estimations may be stitched together for the decoding of all decoding candidates.

In an aspect, a localized search space is where both CCE to REG mapping and PDCCH to CCE mapping are localized. That is, within a PDCCH, all involved REGs are adjacent. Similarly, the localized search space includes CCE to REG mapping, with front loaded DMRS sharing. For example, channel estimation may be performed per PDCCH decoding candidate to maximize the channel estimation gain. However, when PDCCH decoding candidates overlap, multiple rounds of channel estimation may be performed for the overlapping REGs. However, in this case, channel estimation complexity is higher. Further, channel estimation bundling cannot exceed a PDCCH boundary, as REGs outside each PDCCH may be assigned for other UEs, and may not be beamformed to the same direction as the current PDCCH. The minimum unit of channel estimation is one CCE. For channel estimation bundling, the PDCCH boundaries in the search space will be the boundaries of channel estimations.

Figure 3:
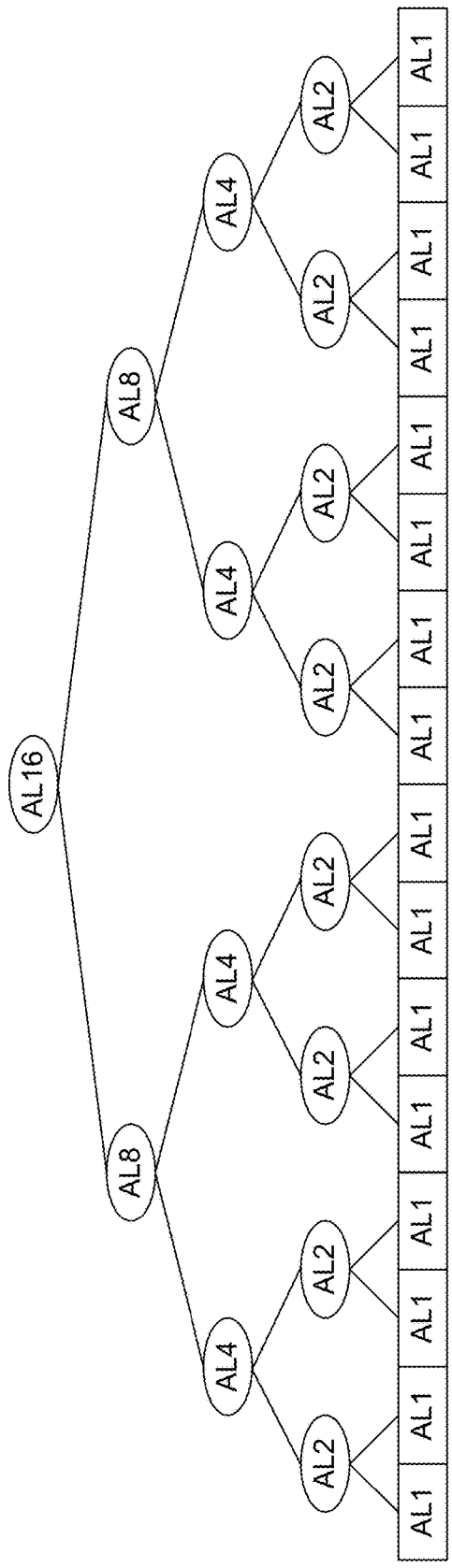
FIG. 3 is a conceptual diagram of an example binary tree having nodes representing decoding candidates and further representing a plurality of aggregation levels corresponding to a localized search space.

Referring to FIG. 3, a conceptual diagram of an example binary tree 300 having nodes representing decoding candidates and further representing a plurality of aggregation levels corresponding to a localized search space is described. In an aspect, for localized mapping, a set of adjacent CCEs may be organized as the base of the binary tree. The root node of the tree may be the size $2^N$ control resource set (CORESET), e.g., root node "AL16" for a CORESET of 16. For example, each parent node can be split into two continuous halves, or branched out, to form two child nodes (e.g., the AL16 node branches to two AL8 nodes). In this example, the base or leaf nodes each represent a CCE. A decoding candidate corresponds to a node in one layer of the tree. Given an aggregation level profile, the search space design becomes the problem to pick a set of nodes in a set of layers of the tree. In some cases, not all layers of the binary tree are useful, and not all nodes in a layer is useful. The UE 110 and/or channel estimation component 150 is configured to use the minimum number of subtrees possible. Further, according to the techniques described herein, different UEs are preferably hashed to different subtrees.

Figure 4:
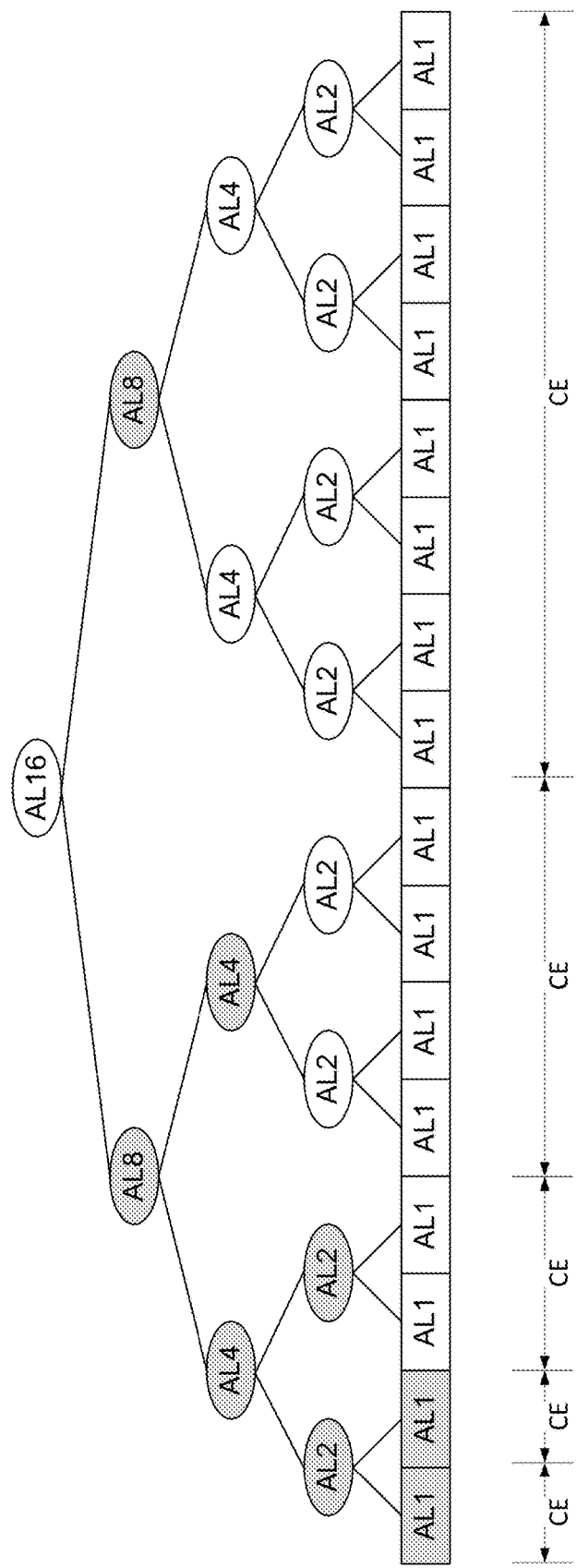
FIGS. 4 and 5 are conceptual diagrams of example binary trees with different sets of nodes selected as decoding candidates for two UEs based on an aggregation level profile having a plurality of aggregation levels and corresponding to a localized search space.
Figure 5:
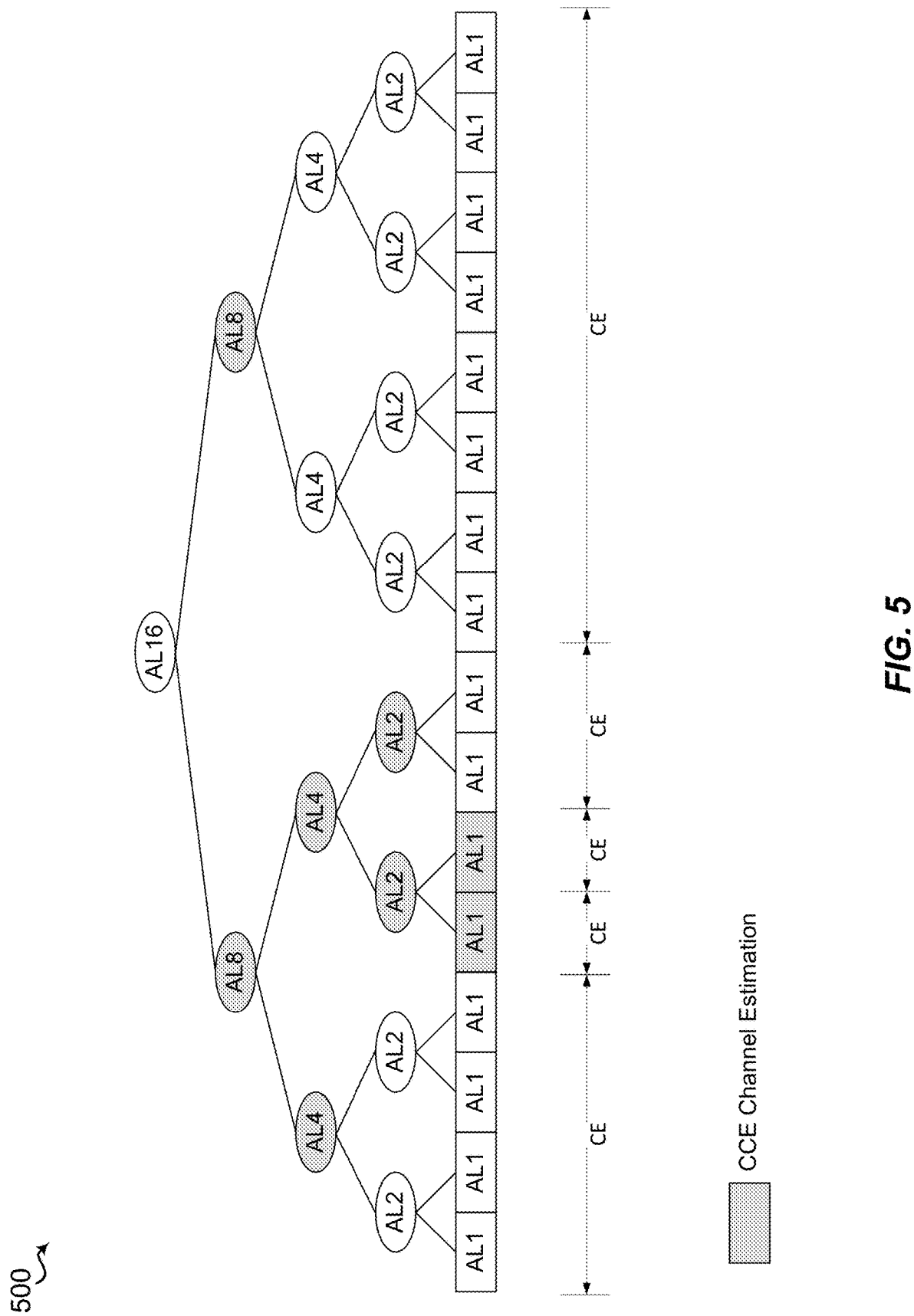

Referring to FIGS. 4 and 5, conceptual diagrams of example binary trees 400 and 500 with different sets of nodes selected (as indicated by the shading) as decoding candidates for two UEs based on an aggregation level profile having a plurality of aggregation levels corresponding to a localized search space are described. For example, a profile of (2, 2, 2, 2) may be identified by UEs with regard to binary trees 400 and 500. For channel estimation, in both cases, the UEs may utilize this binary tree design and the hashing procedure described herein to determine the following channel estimations to perform: two 1 AL CCE channel estimation, one 2 AL CCE channel estimation, one 4 AL CCE channel estimation, and one 8 AL CCE channel estimation. In other words, using the binary tree design and hashing procedure described herein, the UEs can more efficiently perform channel estimation as each CCE and/or each set of CCEs corresponding to a respective decoding candidate may not have to be separately decoded. In some cases using binary trees 400 and 500, there may be instances of collisions between the two UEs in some of the decoding candidates that cannot be avoided, e.g., depending on the randomness of the hashing procedure and depending on the number of UEs using the same binary tree design for the same search space. The hashing procedure enables each UE to hash its search space into a subtree of the binary tree, as indicated by the shaded decoding candidates. The hashing can be defined by a Radio Network Temporary Identifier (RNTI) (e.g., in LTE) or by any Radio Resource Control (RRC) signaling seed (possibly shorter than RNTI).

In an implementation, the UE 110 may start from a full binary tree based on the configured aggregation level profile. Then the UE 110 may initiate a random number generator with a randomized seed (e.g., RNTI or RRC configured value). The random number generator is configured to have different UEs branch in different directions of the binary tree to reduce the chance of collision. Different parts of the tree may be configured to be equally used. The search space is configured to support all aggregation level profiles, though not all profiles may be defined. When the UE 110 is confronted with an aggregation level profile that does not fit the binary tree, for example, the UE 110 and/or channel estimation component 150 may be configured to augment the aggregation level profile in order to allow it to conform to a binary tree. The, the UE 110 may perform the tree based hashing described herein.

Figure 6:
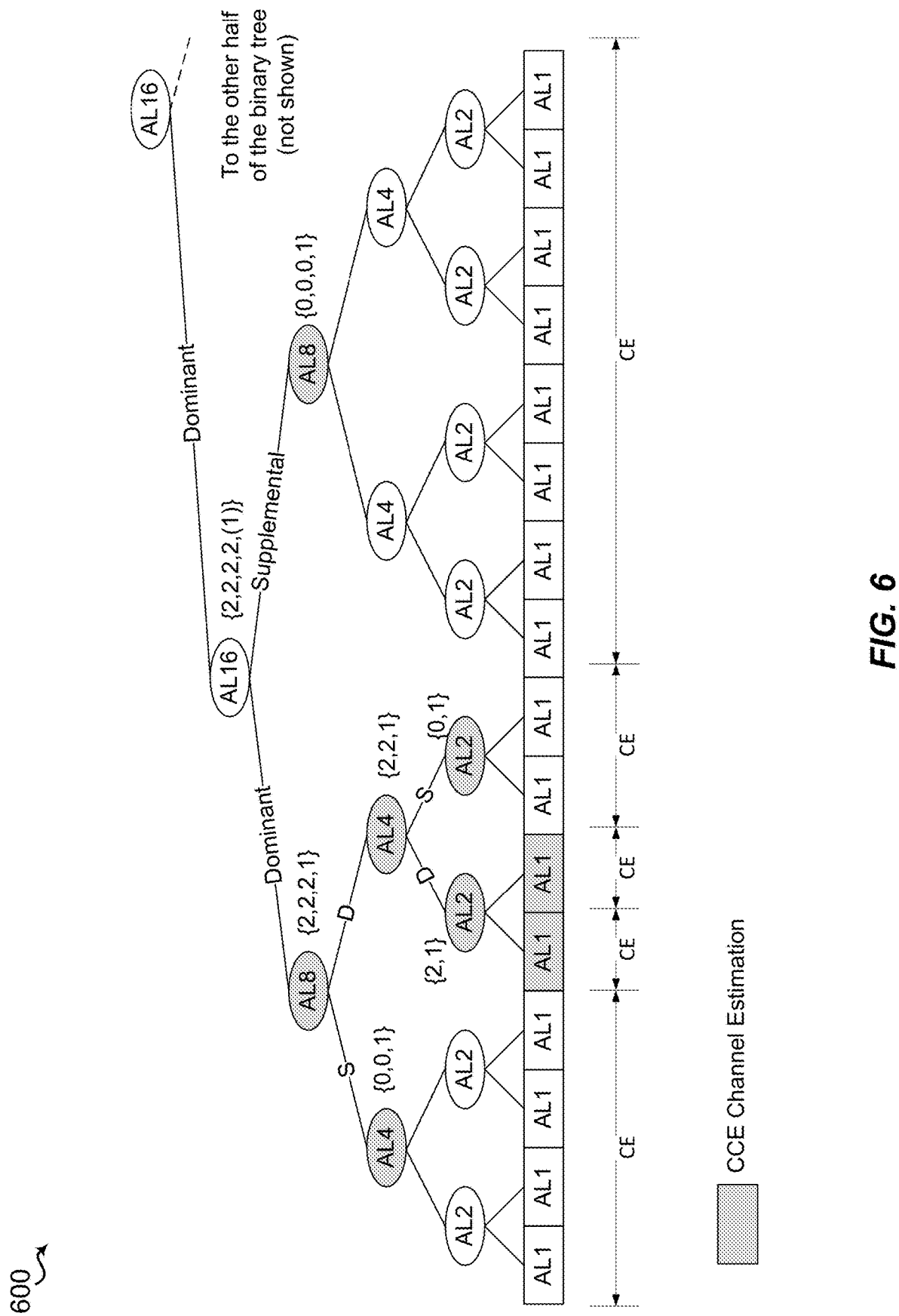
FIGS. 6 and 7 are conceptual diagrams of example binary trees with sets of nodes selected as decoding candidates for a UE, each binary tree having an augmented aggregation profile with a plurality of aggregation levels corresponding to a localized search space.
Figure 7:
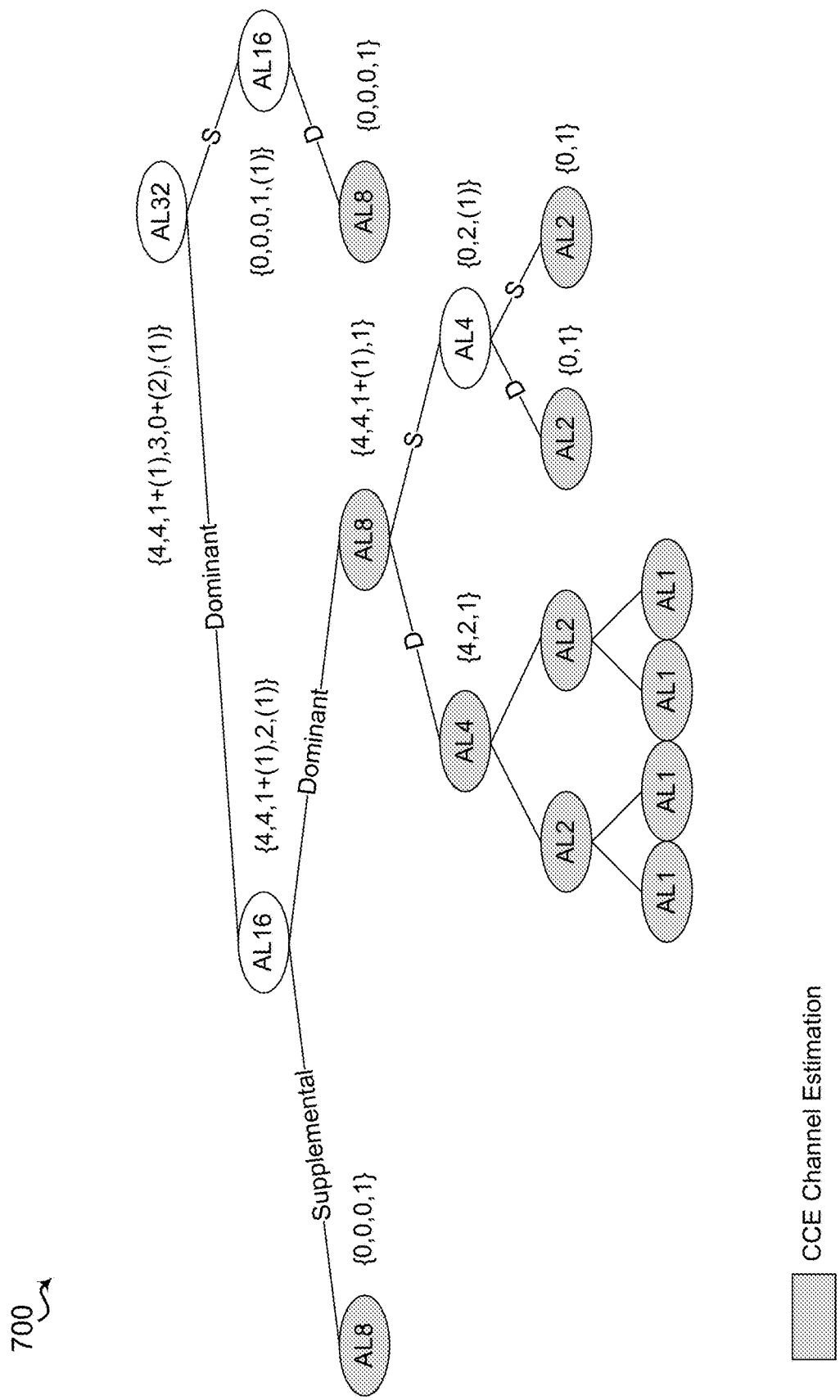
Figure 8:
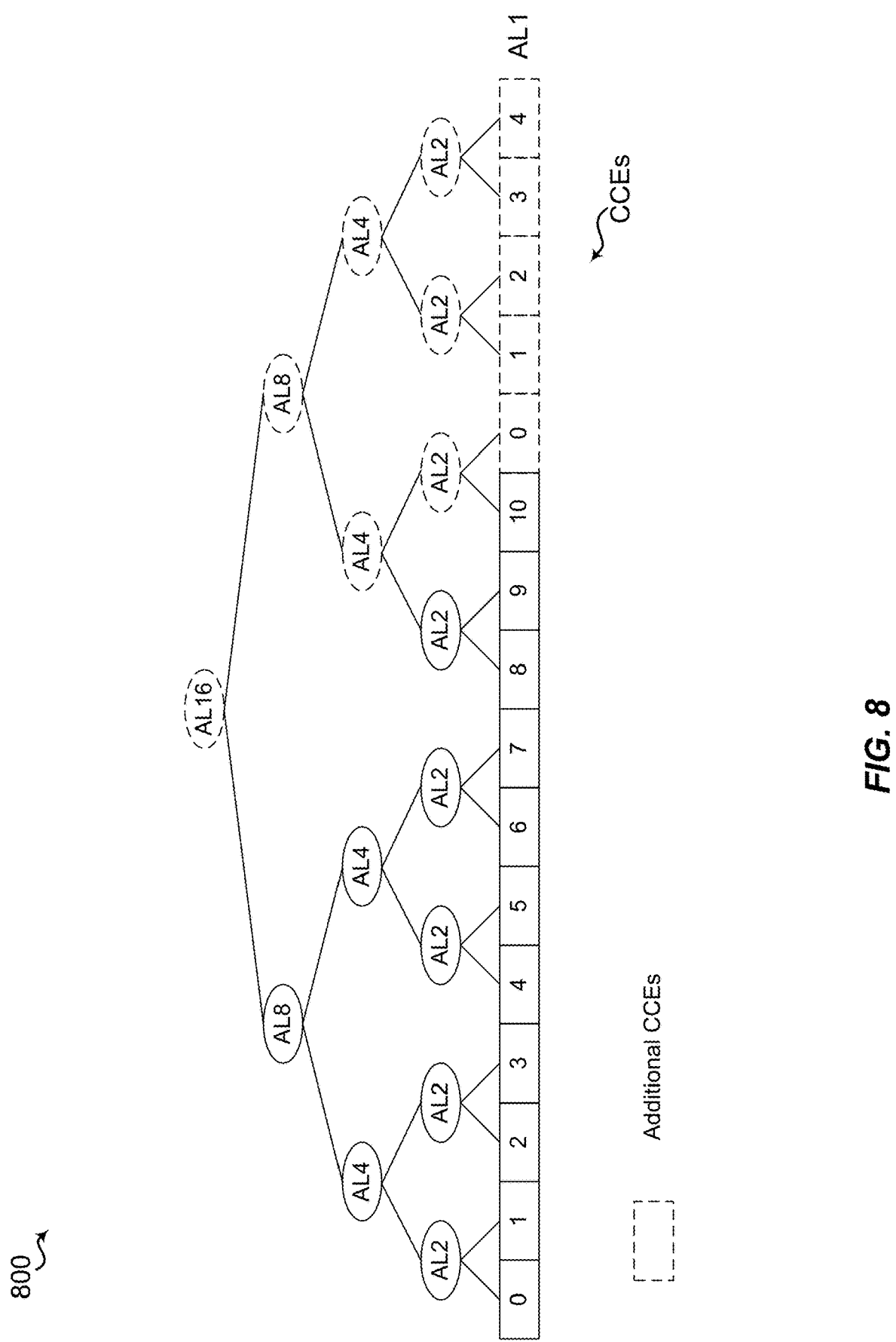
FIGS. 8, 9, 10, 11, 12, and 13 are conceptual diagrams of example binary trees with sets of nodes representing different decoding candidates at different aggregation levels, each with one or more additional CCEs wrapped around or added at the end of the total number of CCEs corresponding to a localized search space.
Figure 9:
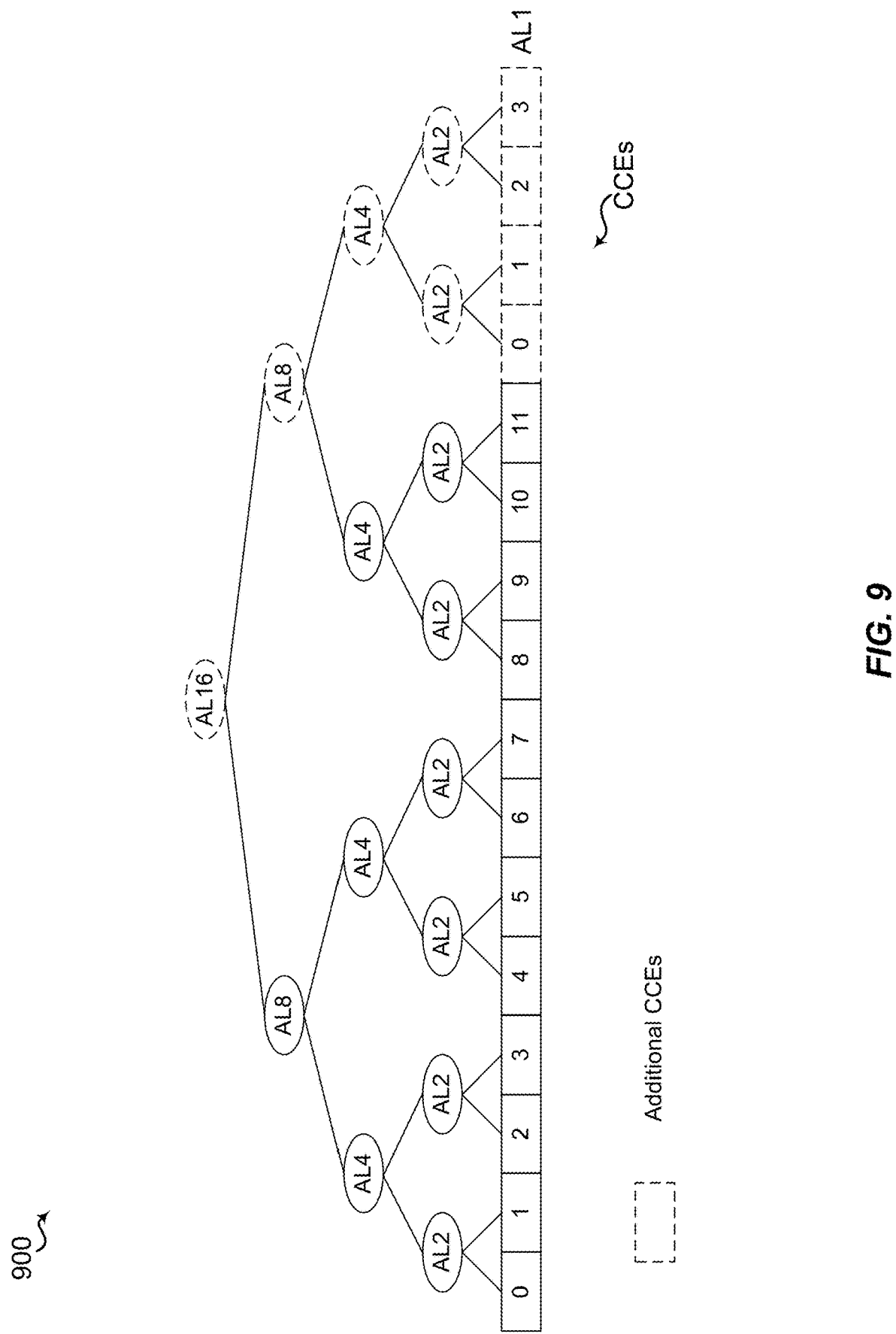
Figure 10:
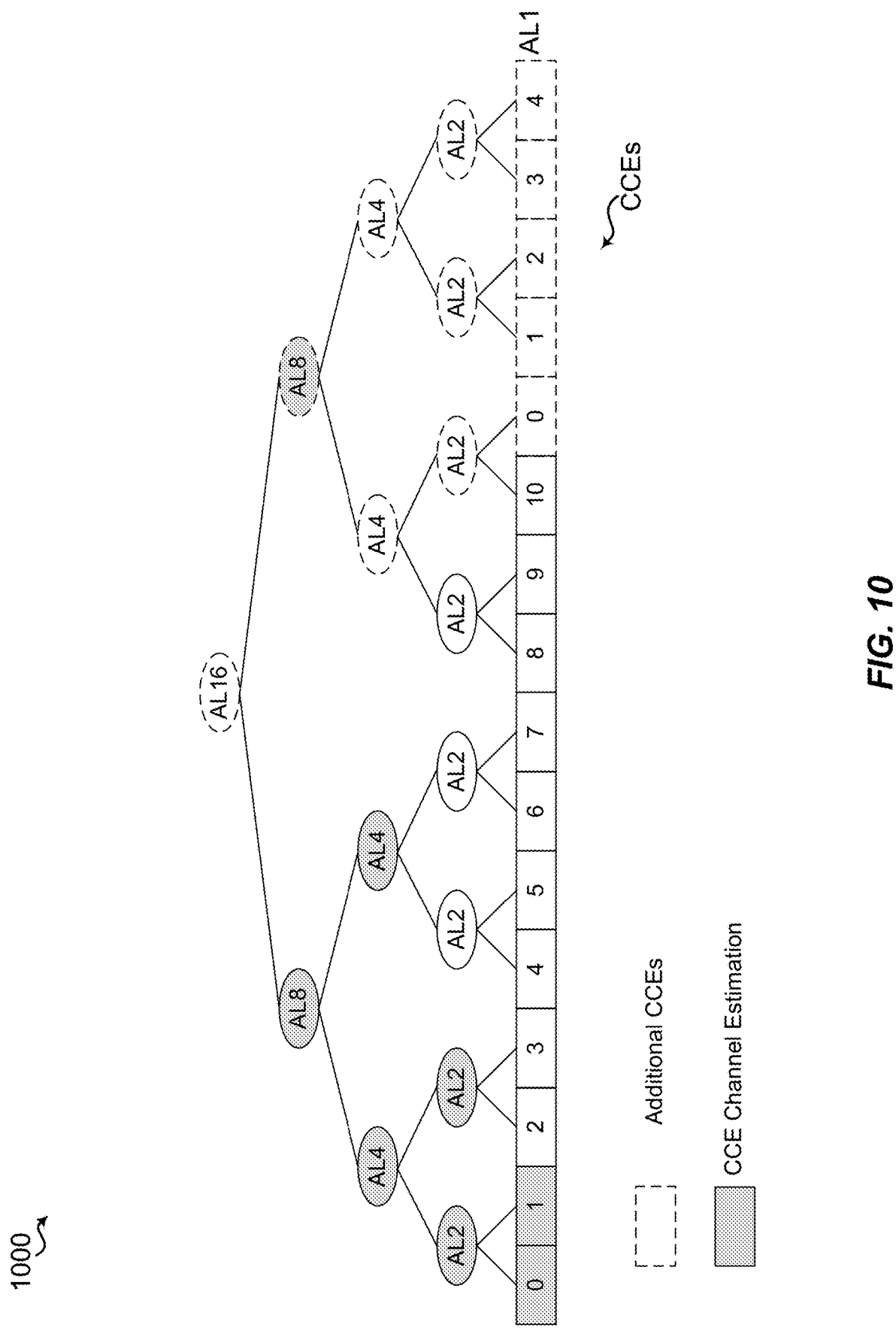
Figure 11:
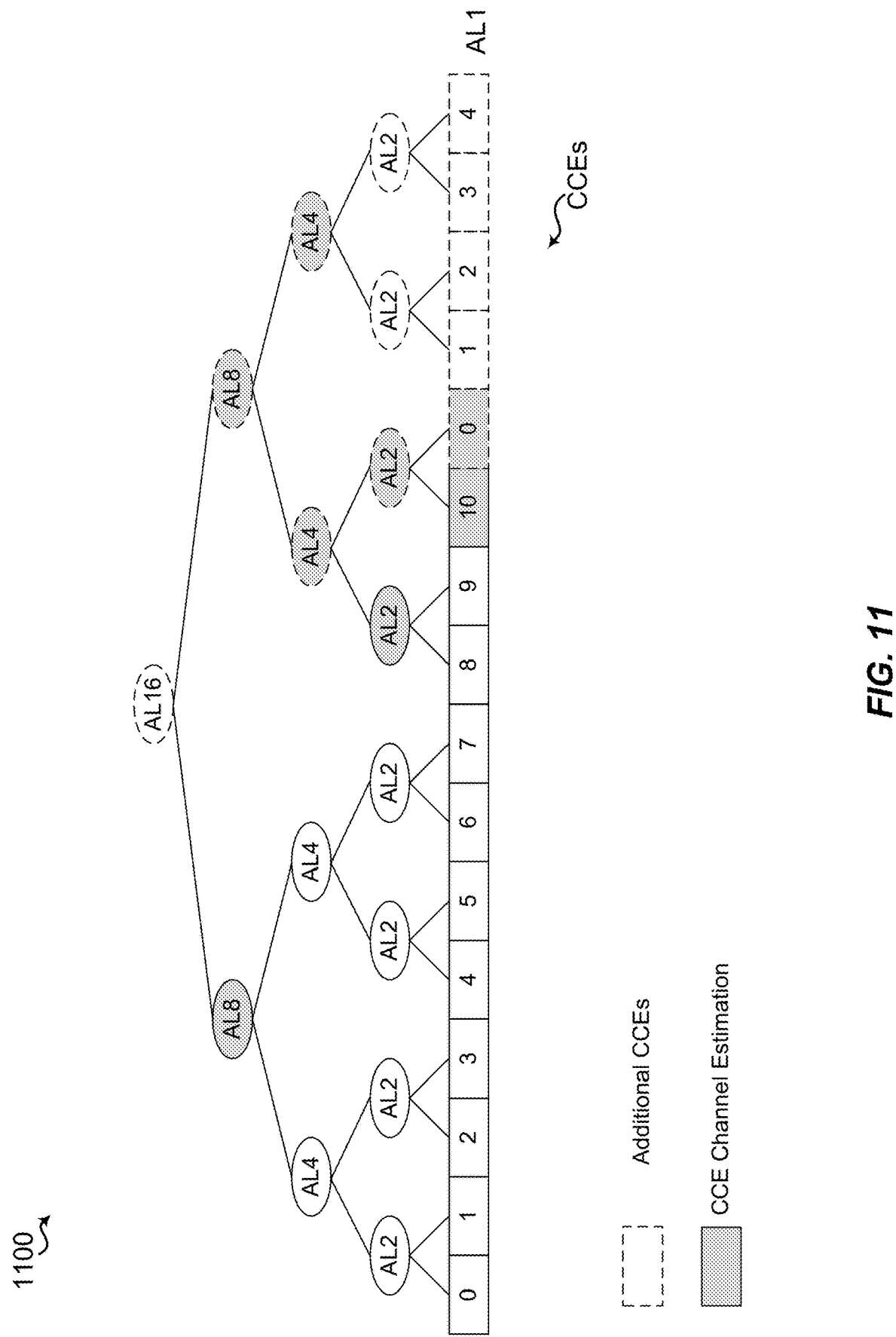
Figure 12:
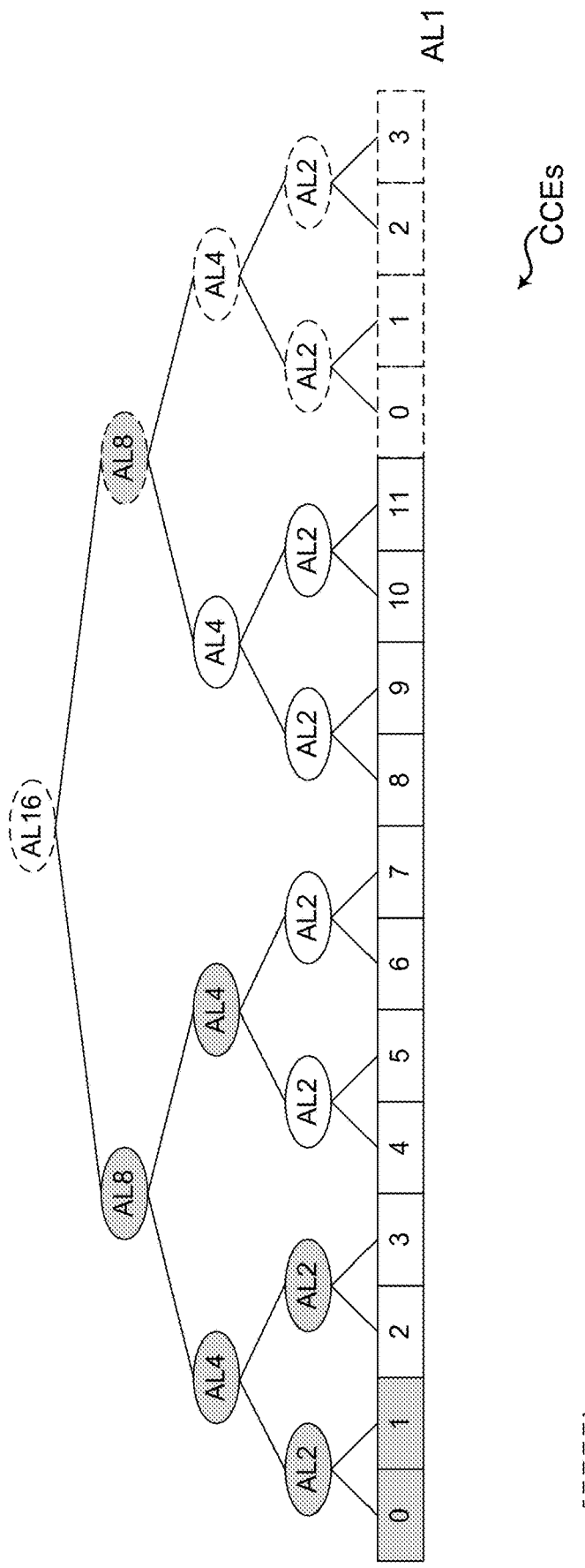
Figure 13:
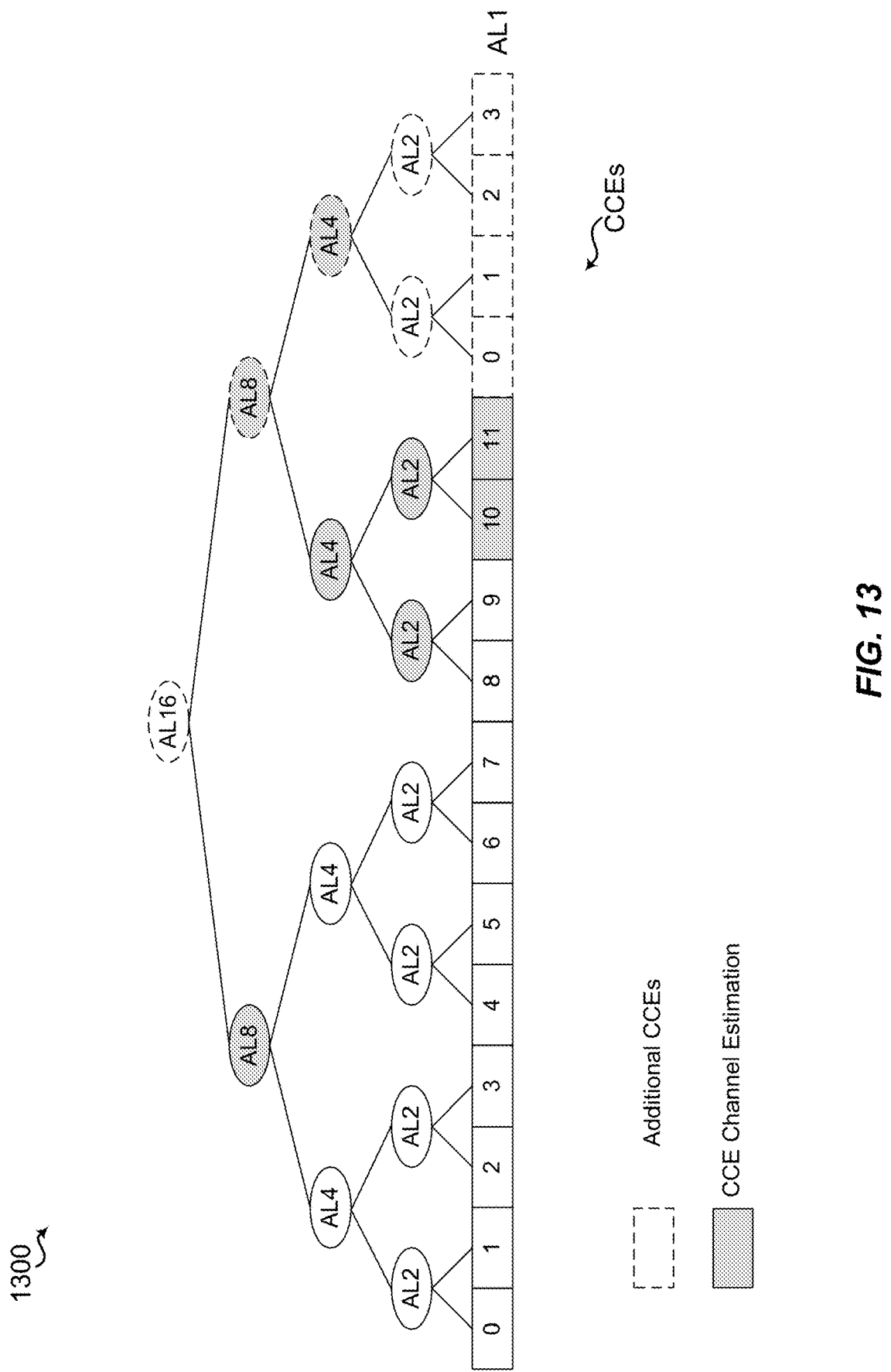

Referring to FIGS. 6 and 7, conceptual diagrams of example binary trees 600 and 700 with sets of nodes selected as decoding candidates for a UE, each binary tree having an augmented profile with a plurality of aggregation levels corresponding to a localized search space are described.

In an aspect, UE 110 and/or channel estimation component 150 is configured to augment the aggregation level profile. In an example, for an aggregation level profile of {8 (AL1), 1 (AL2), 1(AL4)}, it is difficult to directly apply the tree hashing procedure, as 8 AL1 nodes need at least 4 AL2 nodes as parents, while the aggregation level profile only has 1 AL2 node. The augment step may "smooth out" the case when there is a sudden drop in aggregation level profile values where there are not enough parent nodes. Augmenting the aggregation level profile may include the following notations in which the given aggregation level profile is denoted as:

$$\{p_{2^0 L}, p_{2^1 L}, p_{2^2 L}, \ldots, p_{2^N L}\}$$

where L is the minimum aggregation level of the aggregation level profile, $2^N L$ is the maximum aggregation level of the profile, and some $p_{2^n L}$ can be 0. Further the augmented aggregation level profile may be denoted as:

$$\{p'_{2^0 L}, p'_{2^1 L}, p'_{2^2 L}, \ldots, p'_{2^{N'} L}\}$$

where L is the minimum aggregation level of the augmented aggregation level profile and $2^{N'} L$ is the maximum aggregation level of the augmented aggregation level profile. In some cases, $N' \geq N$. Further, the number of augmented nodes may be identified as $a_{2^n L} = p'_{2^n L} - p_{2^n L}$, where $a_{2^n L} \geq 0$.

UE 110 and/or channel estimation component 150 is configured to augment the aggregation level profile based on the following:

Initial condition: $p'_{2^0 L} = p_{2^0 L}$

For $n > 0$, $p'_{2^n L} = \begin{cases} \lceil p'_{2^{n-1} L}/2 \rceil, & \text{if } \lceil p'_{2^{n-1} L}/2 \rceil > p_{2^n L} \\ p_{2^n L}, & \text{if } \lceil p'_{2^{n-1} L}/2 \rceil \leq p_{2^n L} \end{cases}$ Repeat above until $n \geq N$ and $p'_{2^n L} = 1$ For example, aggregation level profile {8,4,2,1} does not need to be augmented. For aggregation level profile {8,4,2,2}, UE 110 and/or channel estimation component 150 is configured to augment to augmented aggregation level profile {8,4,2,2,1}. For aggregation level profile {4,4,1,3}, UE 110 and/or channel estimation component 150 is configured to augment to augmented aggregation level profile {4,4,2,3,2,1}. It should be noted that augmented nodes added to the aggregation level profile may not be selected as decoding candidates.

In an aspect, UE 110 and/or channel estimation component 150 is configured to perform a tree based hashing procedure to preferably assign different nodes of the binary tree to different UEs to use as decoding candidates. For example, UE 110 and/or channel estimation component 150 is configured to start from the root of the binary tree of search space, and use the random number generator to pick one of the left or right branches to move to, one step at a time, until it reaches a node with a size large enough to hold the aggregation level profile. This node will be considered the root of the aggregation level profile.

Further, UE 110 and/or channel estimation component 150 is configured to start from the root of the aggregation level profile, and keep moving down along the tree. In some cases, UE 110 and/or channel estimation component 150 needs to branch out, possibly to both child nodes. At each step, UE 110 and/or channel estimation component 150 is configured to use the same random number generator to pick one of the child node as "dominant" child, while the other child node is "supplemental" child, and split the aggregation level profile between the two children nodes. The dominant child gets the majority of the aggregation level profile, and UE 110 and/or channel estimation component 150 is configured to try to fill the node. If there are augmented nodes in the aggregation level profile, UE 110 and/or channel estimation component 150 is configured to put them in the supplemental child side. The supplemental child gets the remaining part of the aggregation level profile. If a node gets a "full profile" (e.g., such as {4,2,1}), all of the node's child nodes will be in the search space, and the UE 110 and/or channel estimation component 150 is configured to stop the hashing procedure.

In some cases, for simplicity of random number generation, the random number generator operation may avoid generating different numbers for the random numbers for different profiles. Instead, for a binary tree with N layers, UE 110 and/or channel estimation component 150 may be configured to generate one random number (0 or 1) for each node (except the leaf node) regardless of whether the node is used in the search space or not. In these cases, there will be $2^N-1$ random numbers.

For binary tree 600, UE 110 and/or channel estimation component 150 is configured to augment aggregation level profile {2,2,2,2} to augmented aggregation level profile {2,2,2,2,(1)} (i.e., the number in bracket is augmented node). In an example, the CORESET has 32 CCEs. The profile marked at each node always ends with 1. If this 1 is in bracket (augmented node), the node will not be selected in search space.

For binary tree 700, UE 110 and/or channel estimation component 150 is configured to augment aggregation level profile {4,4,1,3} to augmented aggregation level profile {4,4,1+(1),3,0+(2),(1)}. The number in the bracket is the augmented node. In an example, the CORESET has 32 CCEs. Unused nodes are not shown in FIG. 7. For example, all nodes have a binary tree below it except the nodes not used.

Referring to FIGS. 8, 9, 10, 11, 12, and 13, conceptual diagrams of example binary trees 800, 900, 1000, 1100, 1200, and 1300, each with one or more additional CCEs (indicated by dashed line boxes) added at the end of the total number of CCEs corresponding to a localized search space are described.

In some cases, there may be a level of flexibility in CORESET sizes. For example, when the number of CCEs does not correspond to $2^N$ CCEs the CCEs cannot form a complete binary tree structure. However, the binary tree structure needs to be complete for the convenience of aggregation level and search space definition.

In an aspect, UE 110 and/or channel estimation component 150 is configured to allow wrap around at CCE index level (e.g., the set of CCEs at the base of the binary tree) to reach $2^N$ CCEs in order to form a complete binary tree. After the binary tree is computed, UE 110 and/or channel estimation component 150 is configured to define search spaces as described above. In some cases, the CORESET size is K $2^N$ for odd K, and N may be as large possible.

For example, in binary tree 800, 11 CCEs may be configured in CORESET. In this example, N=1 and K=11. The CCE wrap around still works, but after wrap around, the definition of some nodes on the left subtree and right subtree are not aligned.

For example, binary tree 900, 12 CCEs may be configured in CORESET. In this example, N=2 and K=3. Further, in this example, the fourth AL4 tree is a repetition of the first AL4 tree.

For example, in binary trees 1000 and 1100 (corresponding to two separate UEs), 11 CCEs may be configured in CORESET. In this example, an aggregation level profile of (2,2,2,2) is identified by the UEs. In some cases, the channel estimation cannot be bundled when the CCEs in the channel estimation are actually discontinuous.

For example, in binary trees 1200 and 1300 (corresponding to two separate UEs), 12 CCEs may be configured in CORESET. In this example, an aggregation level profile of (2,2,2,2) is identified by the UEs. In some cases the channel estimation cannot be bundled when the CCEs in the channel estimation are actually discontinuous (e.g., CCE index 11 and CCE index 0).

Figure 14:
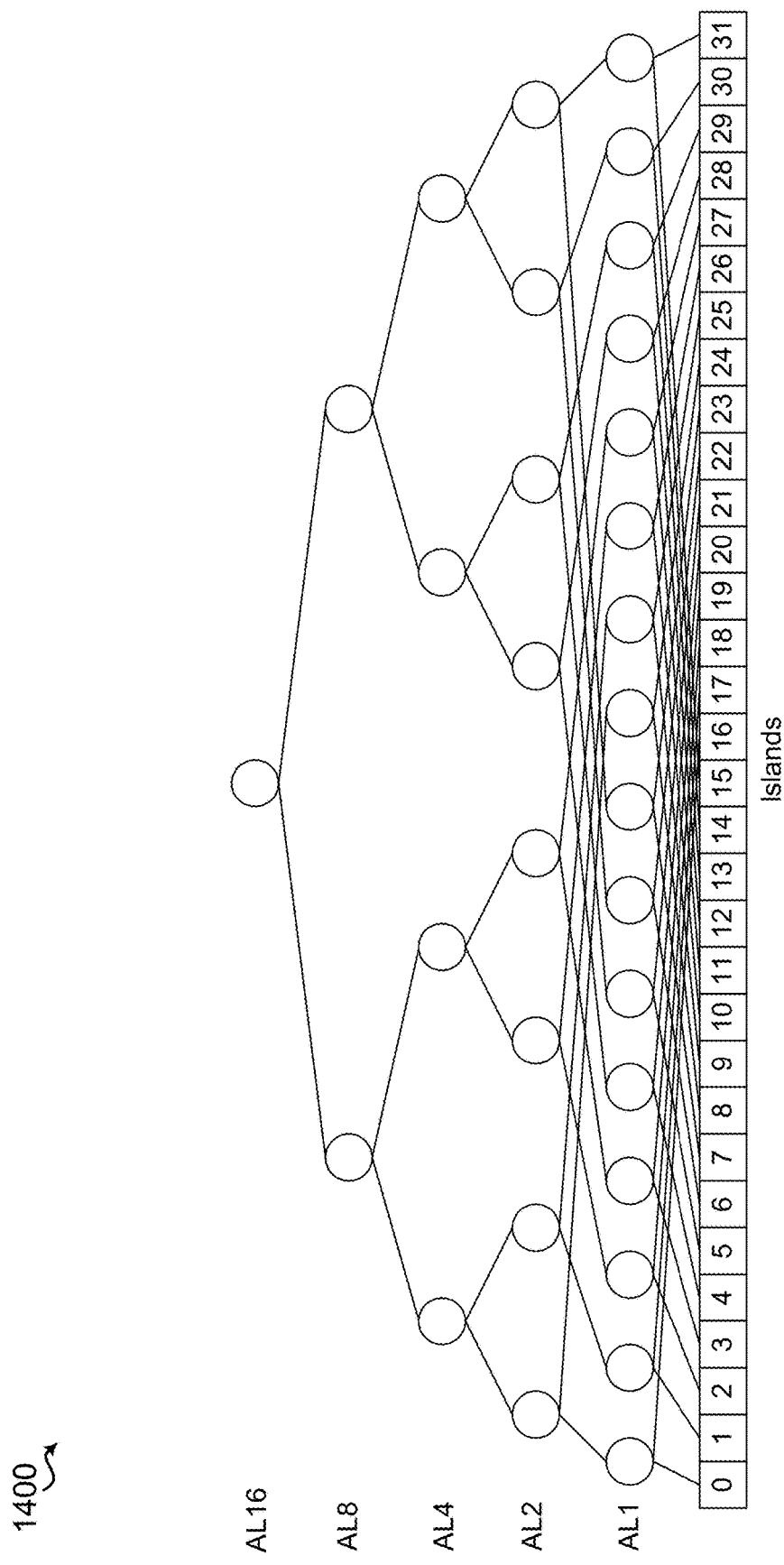
FIGS. 14 and 15 are conceptual diagrams of example binary trees with sets of nodes representing different decoding candidates at different aggregation levels and further including a plurality of islands corresponding to at least a portion of a CCE in at least a partially distributed search space, such as where a distributed approach is used to map the islands to the AL1 and to map AL1 to AL2, and where a localized approach is used at higher aggregation levels.
Figure 15:
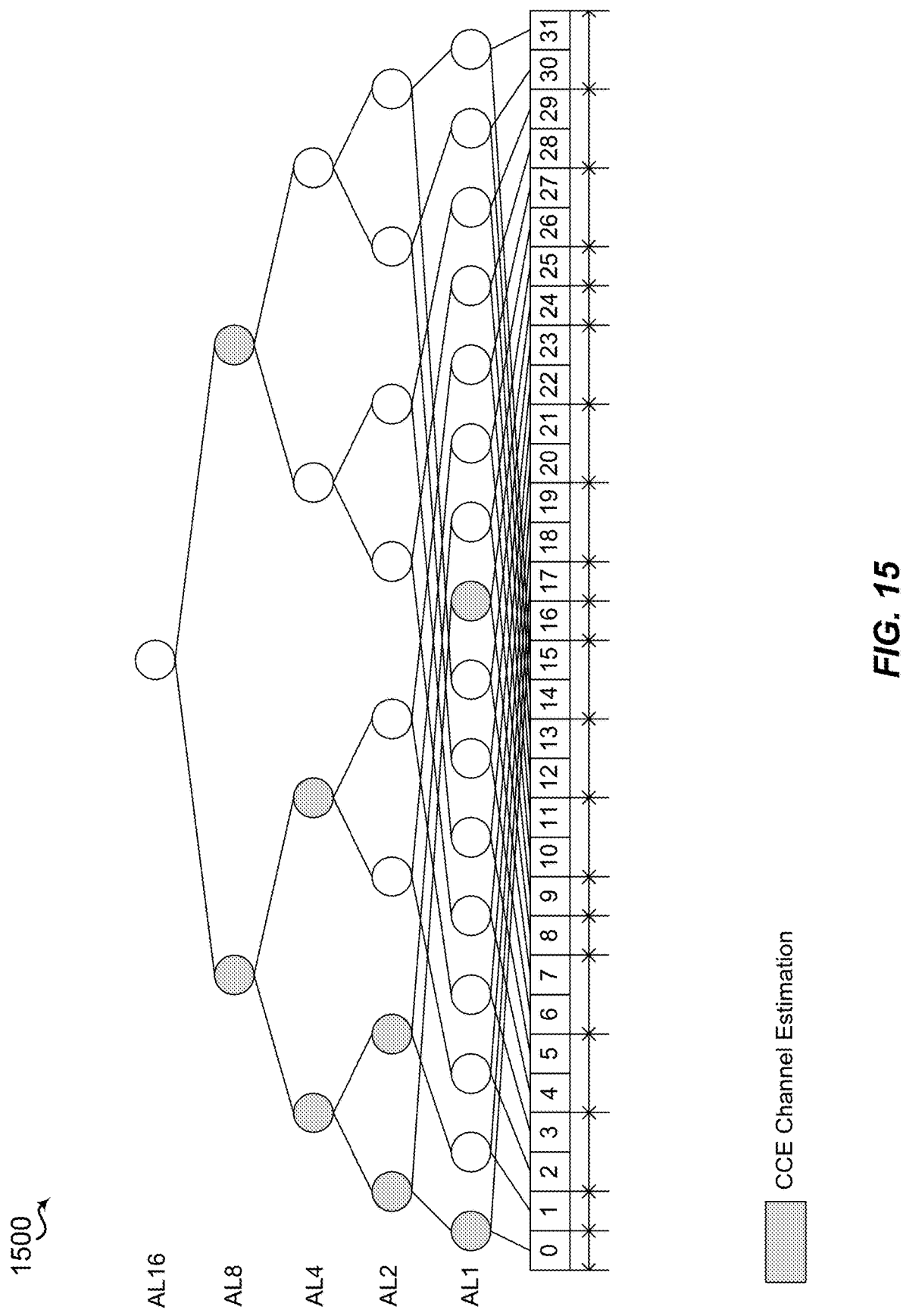

Referring to FIGS. 14 and 15, conceptual diagrams of example binary trees 1400 and 1500 with a plurality of islands corresponding to a distributed search space are described. In some cases, search spaces may include distributed CCE to REG mapping and/or localized CCE to REG mapping, then distributed CCE mapping. For localized CCE to REG mapping, AL1 will not have diversity as all REGs in a CCE are continuous. For distributed CCE to REG mapping, REGs in a CCE may not all be distributed. For channel estimation purposes under embedded DMRS case, some REG bundles may be configured as a unit.

In some cases, the two options can actually be unified in one framework. For example, a basic unit of resources in continuous located REGs is defined as an island. For distributed CCE to REG mapping, the island can be REG or REG bundles. For localized CCE to REG mapping, the island can be one or more CCEs. Islands may be collected in distributed manner to form different aggregation levels. A binary tree approach may be used for this step. Above certain aggregation levels, there is enough diversity level, so further node combination may be performed in a localize manner again for enhanced channel estimation.

In an aspect, when there are $2^N$ islands, UE 110 and/or channel estimation component 150 is configured form the nodes with a complete binary tree structure. For example, the lower levels are constructed with distributed approach. That is, two nodes half way apart are combined to form a parent node. The distributed approach is used until there is enough diversity at the level. The upper levels are constructed with localized approach. That is, two adjacent nodes are combined to form a parent node. This is performed until the root node is reached.

In an aspect, for binary tree 1400, $2^N$ may equal 32. In this example, the island is half CCE. From island to AL1 and from AL1 to AL2, UE 110 and/or channel estimation component 150 is configured to use distributed. For example, AL1 has a diversity level of 2, and AL4 has a diversity level of 4. From AL2 to AL4, from AL4 to AL8, and from AL8 to AL16, localize approach is used. For AL4 upwards, the diversity level stays at 4.

For binary tree 1500, UE 110 and/or channel estimation component 150 is configured to use an aggregation level profile of (2,2,2,2). Based on the aggregation level profile, UE 110 and/or channel estimation component 150 is configured to perform 8 Half CCE channel estimation and 12 one CCE channel estimation. Instead of a baseline of 32 half CCE channel estimation when the candidates are randomly picked in the space. UE 110 and/or channel estimation component 150 is configured to use the same binary tree based hashing algorithm as localized space search.

Figure 16:
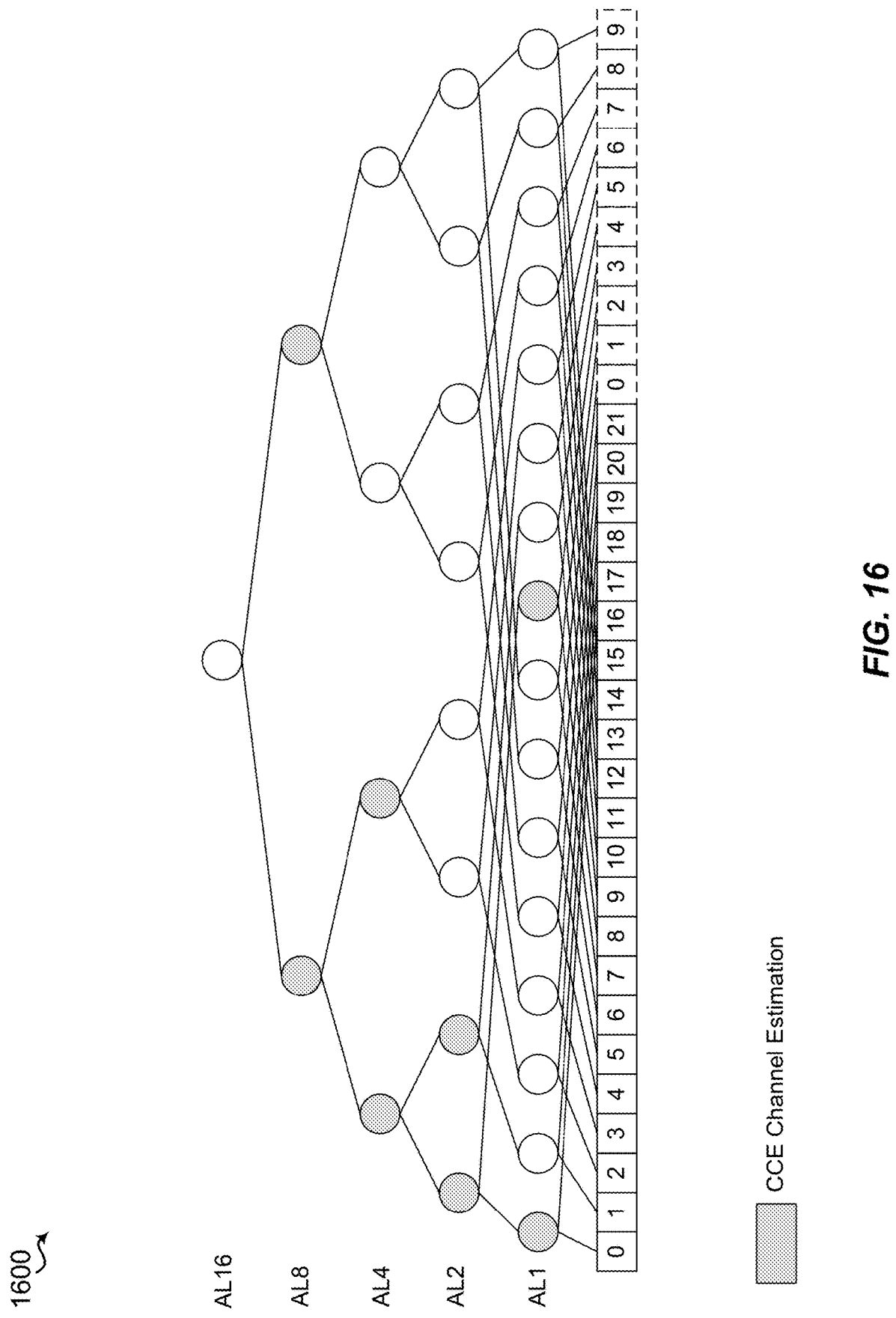
FIGS. 16, 17, and 18 are conceptual diagrams of example binary trees, similar to those of FIGS. 14 and 15, but with one or more additional islands wrapped around or added at the end of the total number of islands.
Figure 17:
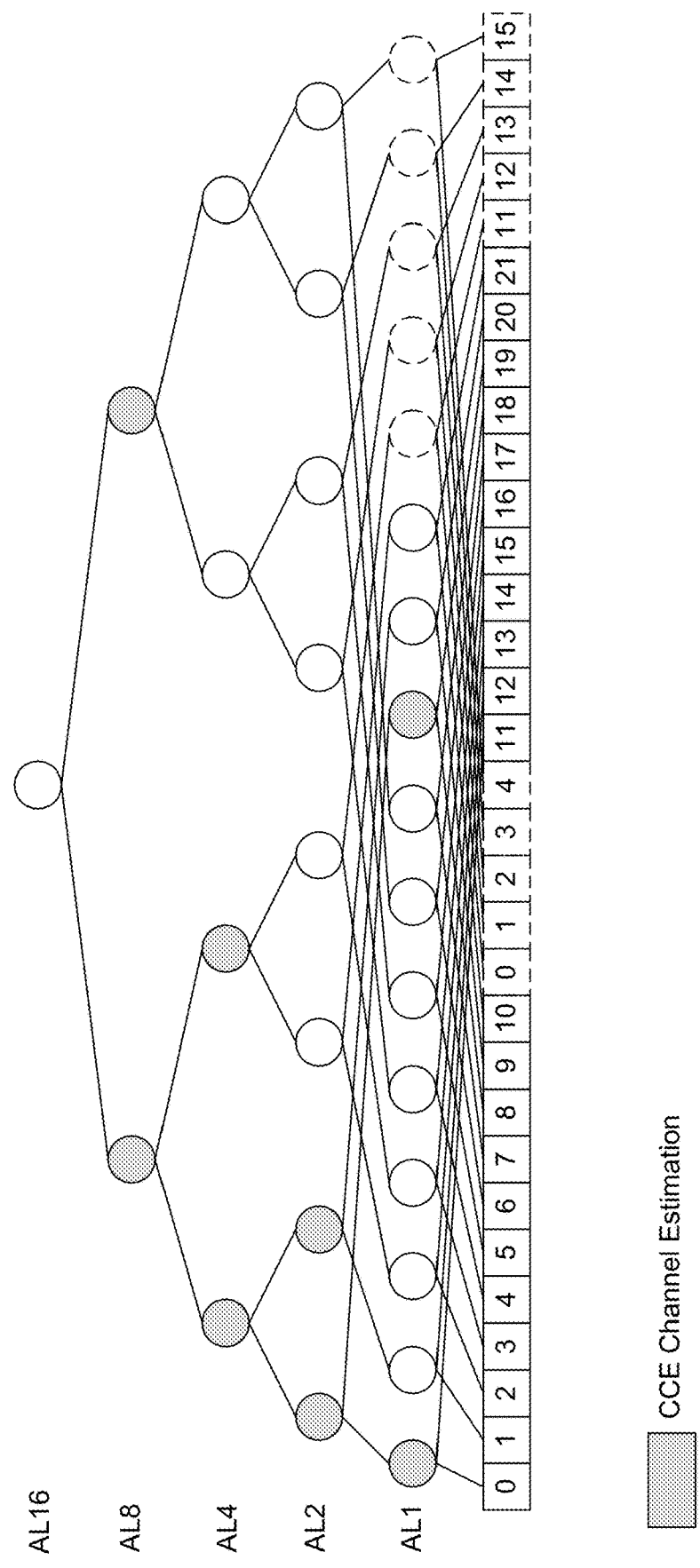
Figure 18:
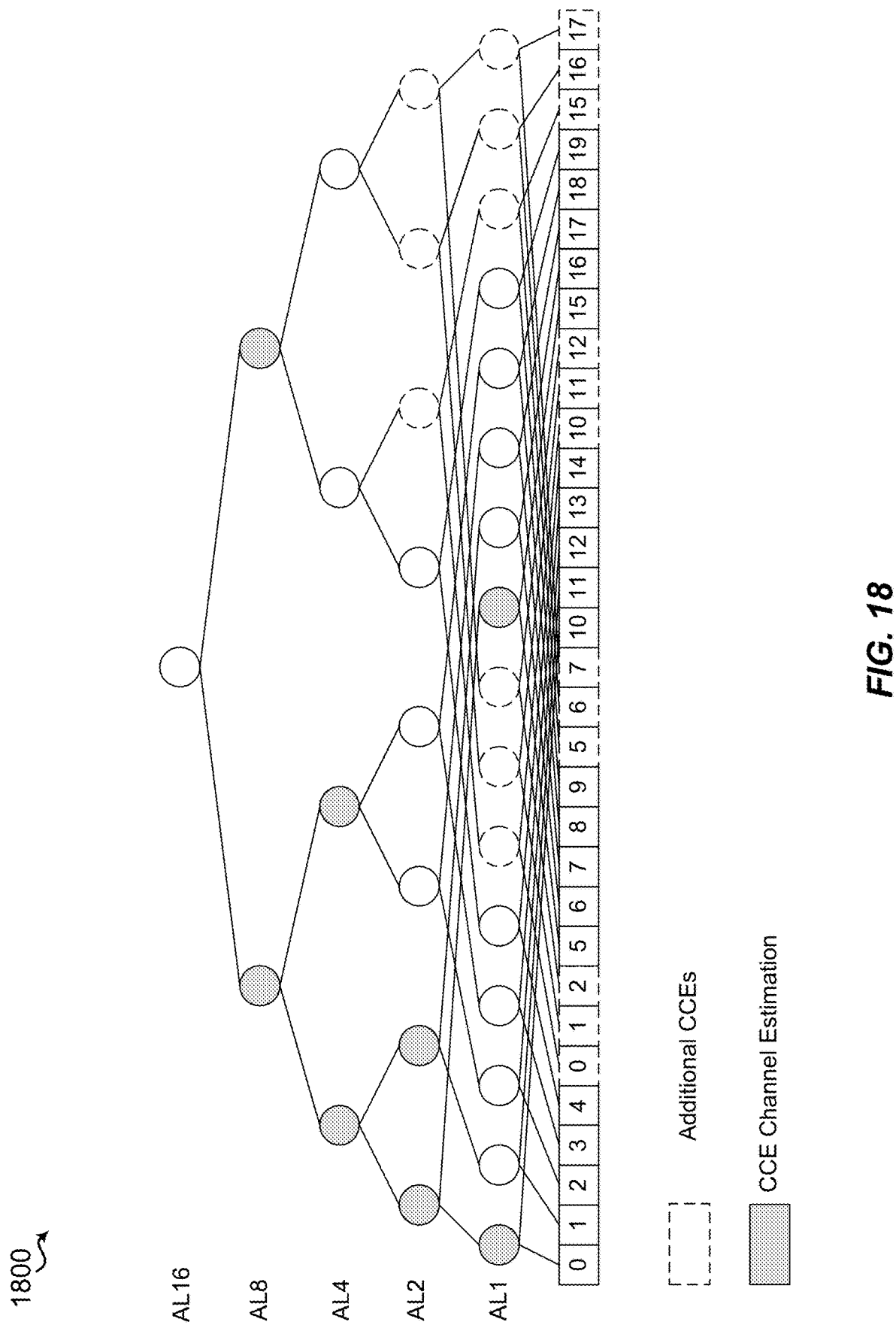

Referring to FIGS. 16, 17, and 18, conceptual diagrams of example binary trees 1600, 1700, and 1800, each with one or more additional islands added at the end of the total number of islands corresponding to a distributed search space are described.

For example, UE 110 and/or channel estimation component 150 is configured to use the binary tree structure, so wrap around needs to be employed. One way is to introduce island level wrap around to reach the next $2^N$ and use the binary tree approach as described above. However, the potential problem is the loss of diversity. In an example, binary tree 1600 includes 22 islands which may be adjusted to 32 islands by island level wrap around. For ALL some of them are 16 islands away, while others are 6 islands away.

In another example, binary tree 1700 includes wrap around at a higher level may be used. Wrap around at AL1 level may be configured with 22 islands. To wrap around at $2^{nd}$ level from bottom, the number of islands need to be even. Some of the aggregation levels may have less CCEs than planned. For example, $1^{st}$ AL8 has 7 CCEs.

In another example, binary tree 1800 includes wrap around at AL2 level, with 20 islands. To wrap around at 3rd level from bottom, the number of islands need to be a multiple of 4.

In an aspect, UE 110 and/or channel estimation component 150 is configured to use wideband DMRS but with distributed PDCCH. When channel estimation is wideband, there is no reason to localize REGs anymore. There is no need to have REG bundles as well. For example, REGs may be distributed from each CCEs as widely as possible. As a result, the design can be a generalization of distributed design with embedded DMRS before. UE 110 and/or channel estimation component 150 is configured to define the basic resource unit as island, and one island is one REG (i.e., no need for REG bundles). Islands may be collected in distributed manner to form different aggregation levels. A binary tree approach can be used for this step. There is no need to switch to localized mode above certain aggregation level as there will be no channel estimation gain. However, in some cases UE 110 and/or channel estimation component 150 is configured to use the single design for both distributed mode. In that case, the only difference is island is REG or REG bundle.

Figure 19:
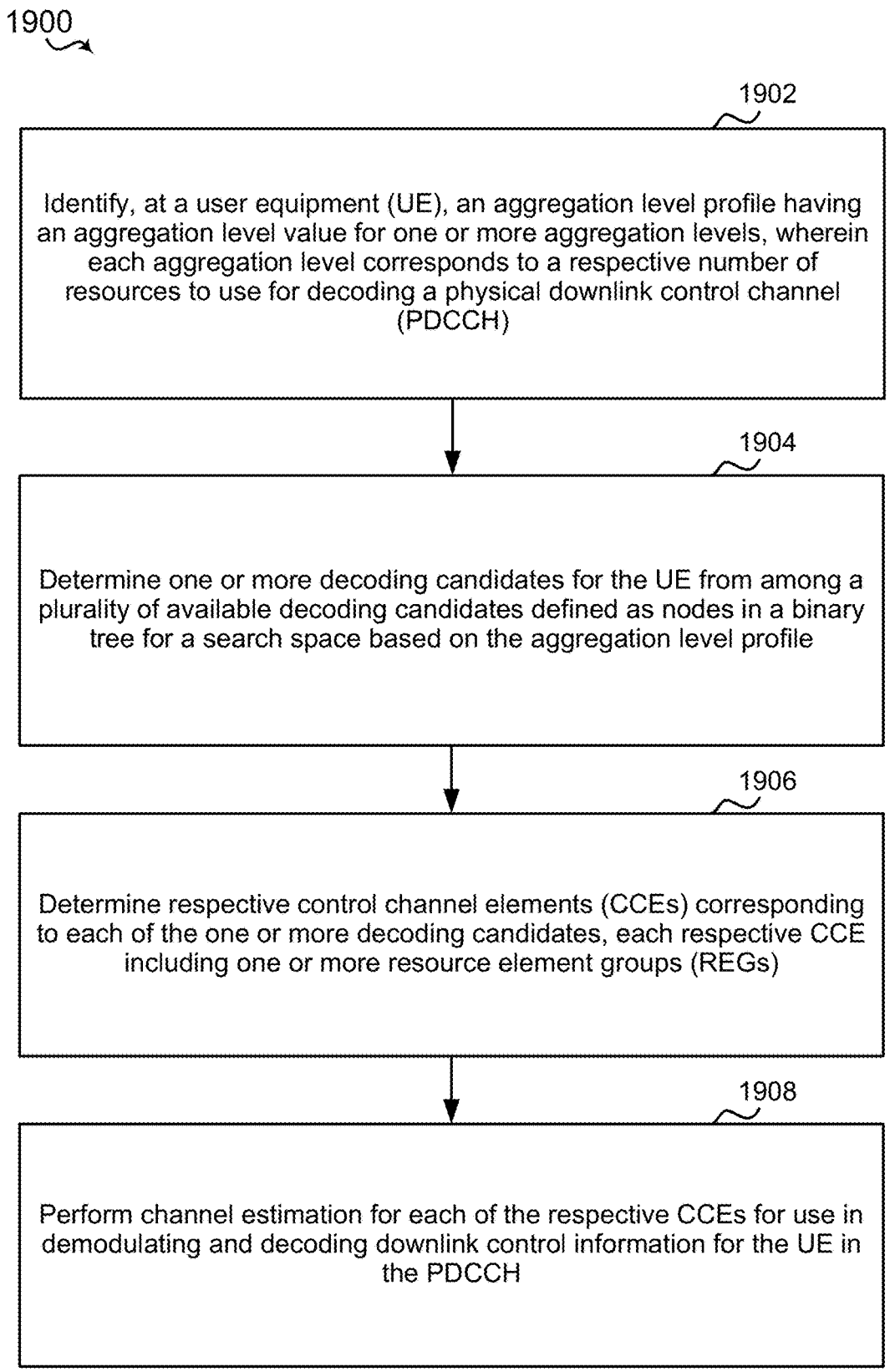
FIG. 19 is a flow diagram of an example of a method of wireless communication at a UE.

Referring to FIG. 19, for example, a method 1900 of wireless communication in operating UE 110 according to the above-described aspects to enhance channel estimation by using a binary tree based PDCCH search space in a new radio wireless communication system includes one or more of the herein-defined actions.

At block 1902, the method 1900 may identify, at a UE, an aggregation level profile having an aggregation level value for one or more aggregation levels, wherein each aggregation level corresponds to a respective number of resources to use for decoding a PDCCH. For example, the UE 110 may execute channel estimation component 150 to identify an aggregation level profile 172 having an aggregation level value for one or more aggregation levels 174, wherein each aggregation level 174 corresponds to a respective number of resources to use for decoding a PDCCH. More specifically, for instance, the base station 105 and/or search space determination component 170 may transmit the aggregation level profile 172 and a randomized seed to the UE 110 and/or channel estimation component 150. The randomized seed may be associated with the UE 110 and include one or more parameters to synchronize the generation of a random number value by UE 110 and the network entity 105. Additional explanation and example implementations are described herein.

At block 1904, the method 1900 may determine one or more decoding candidates for the UE from among a plurality of available decoding candidates defined as nodes in a binary tree for a search space based on the aggregation level profile. For example, the UE 110 may execute channel estimation component 150 to determine one or more decoding candidates 176 for the UE 110 from among a plurality of available decoding candidates 176 defined as nodes in a binary tree for a search space based on the aggregation level profile 172. More specifically, for instance, UE 110 may execute channel estimation component 150 based on the binary tree design and hashing procedure described herein to determine one or more decoding candidates 176 for the UE 110 from among a plurality of available decoding candidates defined as nodes at different aggregation levels in the binary tree for a search space based on the aggregation level profile 172. Additional explanation and example implementations are described herein.

In an aspect, associated with block 1904, method 1900 may include the UE 110 and/or execute channel estimation component 150 performing a hashing procedure on the binary tree to select respective nodes of the binary tree corresponding to the one or more decoding candidates 176, wherein the hashing procedure utilizes a randomized seed associated with the UE 110. Further, associated with block 1904, method 1900 may include the UE 110 and/or execute channel estimation component 150 determining whether to augment the aggregation level profile 172 based on whether the aggregation level profile 172 values for each of the one or more aggregation levels 174 represent nodes that fit within a hashing procedure on the binary tree to select respective nodes of the binary tree corresponding to the one or more decoding candidates 176, and adjusting the aggregation level profile 172 to include at least one augmented node for at least one of the one or more aggregation levels 174 based on a determination to augment the aggregation level profile 172. In some cases, determining the one or more decoding candidates 176 for the search space using the binary tree procedure is based on the aggregation level profile 172 including the at least one augmented node.

In an aspect, associated with block 1904, method 1900 may include the UE 110 and/or execute channel estimation component 150 determining a root node of the nodes of the binary tree defining a control resource set based on the aggregation level profile 172, and iteratively generating a random number value representing a branch direction from the root node down through one or more other nodes of the binary tree. Further, associated with block 1904, method 1900 may include determining whether a full profile set of nodes has been obtained for the one or more other nodes, and stopping the hashing procedure when the full profile set of nodes has been obtained. In some cases, associated with block 1904, method 1900 includes receiving the randomized seed received from a network entity 105, wherein iteratively generating the random number value further comprises iteratively generating the random number value based the randomized seed, the randomized seed including one or more parameters to synchronize the generation of the random number value by UE 110 and the network entity 105.

At block 1906, the method 1900 may determine respective CCEs corresponding to each of the one or more decoding candidates, each respective CCE including one or more REGs. For example, the UE 110 may execute channel estimation component 150 to determine respective CCEs 152 corresponding to each of the one or more decoding candidates 176, each respective CCE 152 including one or more REGs. Additional explanation and example implementations are described herein.

In an aspect, associated with block 1906, method 1900 may include determining sets of one or more adjacent CCEs 152. Further, associated with block 1906, method 1900 may include determining whether to bundle one or more CCEs 152 of the respective CCEs 152 based on a PDCCH boundary in the search space, and bundling one or more CCEs 152 of the respective CCEs 152 based on a determination to bundle the one or more CCEs 152.

In an aspect, associated with block 1906, method 1900 may include the UE 110 and/or execute channel estimation component 150 determining whether a total number of CCEs 152 established by the aggregation level profile 172 corresponds to a binary tree structure of the binary tree, and generating one or more additional CCEs 152 to include within the binary tree structure of the binary tree based on a determination that the total number of CCEs 152 does not correspond to the binary tree structure. Further, associated with block 1906, method 1900 may include the UE 110 and/or execute channel estimation component 150 adding the one or more additional CCEs 152 to an end of the total number of CCEs 152, wherein the one or more additional CCEs 152 are a subset of sequential CCEs 152 obtained from a start of the total number of CCEs 152, and avoiding performing channel estimation using at least a last one of the total number of CCEs 152 and a first one of the one or more additional CCEs 152 when the last one and the first one are discontinuous.

In an aspect, associated with block 1906, method 1900 may include the UE 110 and/or execute channel estimation component 150 determining that at least some of the respective CCEs 152 are sets of one or more non-adjacent CCEs 152. Further, associated with block 1906, method 1900 may include the UE 110 and/or execute channel estimation component 150 determining one or more island units for the search space based on the aggregation level profile 172, each island unit corresponding to at least a plurality of continuous REGs, determining whether a total number of the one or more island units corresponds to a binary tree structure of the binary tree, and performing a hashing procedure with the one or more island units on the search space using the aggregation level profile 172 to obtain a full profile set of nodes based on a determination that the total number of the one or more island units corresponds to the binary tree structure.

In an aspect, associated with block 1906, method 1900 may include the UE 110 and/or execute channel estimation component 150 generating one or more additional island units to include within the binary tree structure of the binary tree based on a determination that the total number of the one or more island units does not correspond to the binary tree structure. In some cases, performing the hashing procedure further comprises performing the hashing procedure with the one or more island units and the one or more additional island units. Further, each island unit corresponds to at least one of a REG bundle or one or more CCEs 152.

At block 1908, the method 1900 may perform channel estimation for each of the respective CCEs 152 for use in demodulating and decoding downlink control information for the UE 110 in the PDCCH. For example, the UE 110 may execute channel estimation component 150 to perform channel estimation for each of the respective CCEs 152 for use in demodulating and decoding downlink control information for the UE 110 in the PDCCH. In some cases, performing channel estimation for each of the respective CCEs 152 further comprises performing channel estimation for the bundled one or more CCEs 152. Additional explanation and example implementations are described herein.

Figure 20:
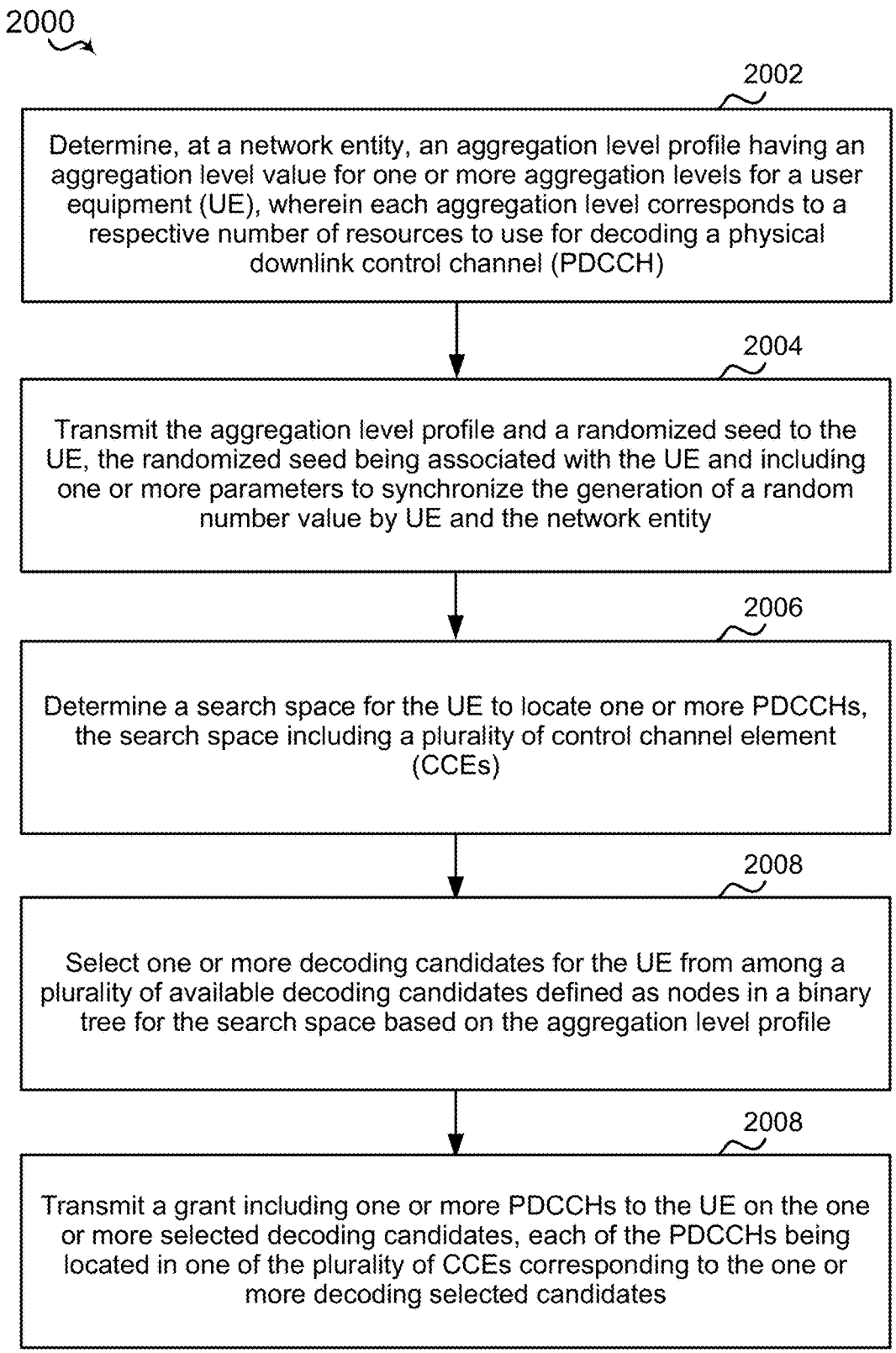
FIG. 20 is a flow diagram of an example of a method of wireless communication at a network entity.

Referring to FIG. 20, for example, a method 2000 of wireless communication in operating a network entity such as base station 105 (e.g., gNodeB) according to the above-described aspects to enhancing a UE's capability of performing channel estimation by using a binary tree based PDCCH search space to generate an aggregation level profile in a new radio environment includes one or more of the herein-defined actions.

At block 2002, the method 2000 may determine, at a network entity, an aggregation level profile having an aggregation level value for one or more aggregation levels for a UE, wherein each aggregation level corresponds to a respective number of resources to use for decoding a PDCCH. For example, in an aspect, the base station 105 may execute search space determination component 170 to determine an aggregation level profile 172 having an aggregation level value for one or more aggregation levels 174 for a UE 110, wherein each aggregation level 174 corresponds to a respective number of resources to use for decoding a PDCCH. In an example, each island unit corresponds to at least one of a REG bundle or one or more CCEs 154. Additional explanation and example implementations are described herein.

At block 2004, the method 2000 may transmit the aggregation level profile and a randomized seed to the UE, the randomized seed being associated with the UE and including one or more parameters to synchronize the generation of a random number value by UE and the network entity. For example, in an aspect, the base station 105 and/or search space determination component 170 may execute transceiver 1302 (FIG. 22) to transmit the aggregation level profile 172 and a randomized seed to the UE 110, the randomized seed being associated with the UE 110 and including one or more parameters to synchronize the generation of a random number value by UE 110 and the network entity 105. Additional explanation and example implementations are described herein.

At block 2006, the method 2000 may determine a search space for the UE to locate one or more PDCCHs, the search space including a plurality of CCEs. For example, in an aspect, the base station 105 may execute search space determination component 170 to determine a search space for the UE 110 to locate one or more PDCCHs, the search space including a plurality of CCEs 152. In an example, the search space includes sets of one or more adjacent CCEs 152. Additional explanation and example implementations are described herein.

At block 2008, the method 2000 may select one or more decoding candidates for the UE from among a plurality of available decoding candidates defined as nodes in a binary tree for the search space based on the aggregation level profile. For example, in an aspect, the base station 105 may execute search space determination component 170 to selecting one or more decoding candidates 176 for the UE 110 from among a plurality of available decoding candidates 176 defined as nodes in a binary tree for the search space based on the aggregation level profile 172. Additional explanation and example implementations are described herein.

In an aspect, associated with block 2008, method 2000 may include the base station 105 and/or search space determination component 170 performing a hashing procedure on the binary tree to select respective nodes of the binary tree corresponding to the one or more decoding candidates 176, wherein the hashing procedure utilizes the randomized seed associated with the UE 110. In some cases, performing the hashing procedure on the binary tree further comprises the base station 105 and/or search space determination component 170 determining a root node of the nodes of the binary tree defining the search space based on the aggregation level profile 172, iteratively generating the random number value representing a branch direction from the root node down through one or more other nodes of the binary tree, determining whether a full profile set of nodes has been obtained for the one or more other nodes, and stopping the hashing procedure when the full profile set of nodes has been obtained.

In an aspect, the search space includes at least some of the respective CCEs 152 that are sets of one or more non-adjacent CCEs 152. For example, associated with block 2008, method 2000 may include the base station 105 and/or search space determination component 170 determining one or more island units for the search space based on the aggregation level profile 172, each island unit corresponding to at least a plurality of continuous REGs, determining whether a total number of the one or more island units corresponds to a binary tree structure of the binary tree, and performing a hashing procedure with the one or more island units on the search space using the aggregation level profile 172 to obtain a full profile set of nodes based on a determination that the total number of the one or more island units corresponds to the binary tree structure.

In an aspect, associated with block 2008, method 2000 may include the base station 105 and/or search space determination component 170 generating one or more additional island units to include within the binary tree structure of the binary tree based on a determination that the total number of the one or more island units does not correspond to the binary tree structure. In some cases, performing the hashing procedure further comprises performing the hashing procedure with the one or more island units and the one or more additional island units.

At block 2010, the method 2000 may transmit a grant including one or more PDCCHs to the UE on the one or more selected decoding candidates, each of the PDCCHs being located in one of the plurality of CCEs corresponding to the one or more selected decoding candidates. For example, in an aspect, the base station 105 and/or search space determination component 170 may execute transceiver 1302 (FIG. 22) to transmit a grant including one or more PDCCHs to the UE 110 on the one or more selected decoding candidates 176, each of the PDCCHs being located in one of the plurality of CCEs 152 corresponding to the one or more selected decoding candidates 176. Additional explanation and example implementations are described herein.

Figure 21:
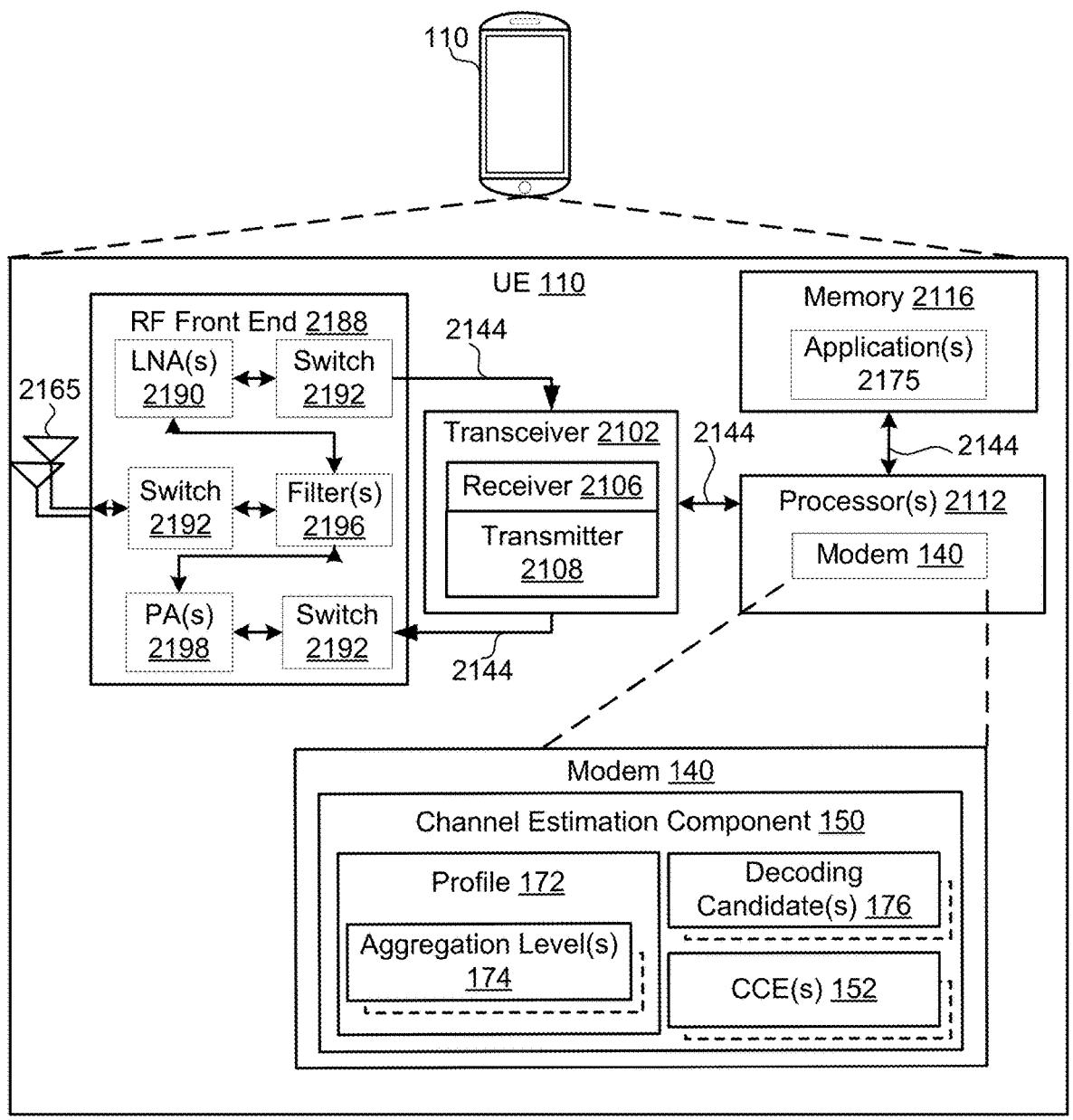
FIG. 21 is a schematic diagram of example components of the UE of FIG. 1.

Referring to FIG. 21, one example of an implementation of an UE 110 may include a variety of components, some of which have already been described above, but including components such as one or more processors 2112 and memory 2116 and transceiver 2102 in communication via one or more buses 2144, which may operate in conjunction with modem 140 and channel estimation component 150 to enable one or more of the functions described herein related to enhancing channel estimation by using a binary tree based PDCCH search space in a new radio wireless communication system. Further, the one or more processors 2112, modem 2114, memory 2116, transceiver 2102, radio frequency (RF) front end 2188 and one or more antennas 2165, may be configured to support voice and/or data calls (simultaneously or non-simultaneously) in one or more radio access technologies. In some aspects, the modem 2114 may be the same as or similar to the modem 140 (FIG. 1).

In an aspect, the one or more processors 2112 can include a modem 2114 that uses one or more modem processors. The various functions related to channel estimation component 150 may be included in modem 140 and/or processors 2112 and, in an aspect, can be executed by a single processor, while in other aspects, different ones of the functions may be executed by a combination of two or more different processors. For example, in an aspect, the one or more processors 2112 may include any one or any combination of a modem processor, or a baseband processor, or a digital signal processor, or a transmit processor, or a receiver processor, or a transceiver processor associated with transceiver 2102. In other aspects, some of the features of the one or more processors 2112 and/or modem 140 associated with channel estimation component 150 may be performed by transceiver 2102.

Also, memory 2116 may be configured to store data used herein and/or local versions of applications 2175 or channel estimation component 150 and/or one or more of its subcomponents being executed by at least one processor 2112. Memory 2116 can include any type of computer-readable medium usable by a computer or at least one processor 2112, such as random access memory (RAM), read only memory (ROM), tapes, magnetic discs, optical discs, volatile memory, non-volatile memory, and any combination thereof. In an aspect, for example, memory 2116 may be a non-transitory computer-readable storage medium that stores one or more computer-executable codes defining channel estimation component 150 and/or one or more of its subcomponents, and/or data associated therewith, when UE 110 is operating at least one processor 2112 to execute channel estimation component 150 and/or one or more of its subcomponents.

Transceiver 2102 may include at least one receiver 2106 and at least one transmitter 2108. Receiver 2106 may include hardware, firmware, and/or software code executable by a processor for receiving data, the code comprising instructions and being stored in a memory (e.g., computer-readable medium). Receiver 2106 may be, for example, a RF receiver. In an aspect, receiver 2106 may receive signals transmitted by at least one base station 105. Additionally, receiver 2106 may process such received signals, and also may obtain measurements of the signals, such as, but not limited to, Ec/Io, SNR, RSRP, RSSI, etc. Transmitter 2108 may include hardware, firmware, and/or software code executable by a processor for transmitting data, the code comprising instructions and being stored in a memory (e.g., computer-readable medium). A suitable example of transmitter 2108 may include, but is not limited to, an RF transmitter.

Moreover, in an aspect, the UE 110 may include RF front end 2188, which may operate in communication with one or more antennas 2165 and transceiver 2102 for receiving and transmitting radio transmissions, for example, wireless communications transmitted by at least one base station 105 or wireless transmissions transmitted by the UE 110. RF front end 2188 may be connected to one or more antennas 2165 and can include one or more low-noise amplifiers (LNAs) 2190, one or more switches 2192, one or more power amplifiers (PAs) 2198, and one or more filters 2196 for transmitting and receiving RF signals.

In an aspect, LNA 2190 can amplify a received signal at a desired output level. In an aspect, each LNA 2190 may have a specified minimum and maximum gain values. In an aspect, RF front end 2188 may use one or more switches 2192 to select a particular LNA 2190 and its specified gain value based on a desired gain value for a particular application.

Further, for example, one or more PA(s) 2198 may be used by RF front end 2188 to amplify a signal for an RF output at a desired output power level. In an aspect, each PA 2198 may have specified minimum and maximum gain values. In an aspect, the RF front end 2188 may use one or more switches 2192 to select a particular PA 2198 and a corresponding specified gain value based on a desired gain value for a particular application.

Also, for example, one or more filters 2196 can be used by the RF front end 2188 to filter a received signal to obtain an input RF signal. Similarly, in an aspect, for example, a respective filter 2196 can be used to filter an output from a respective PA 2198 to produce an output signal for transmission. In an aspect, each filter 2196 can be connected to a specific LNA 2190 and/or PA 2198. In an aspect, RF front end 2188 can use one or more switches 2192 to select a transmit or receive path using a specified filter 2196, LNA 2190, and/or PA 2198, based on a configuration as specified by transceiver 2102 and/or processor 2112.

As such, transceiver 2102 may be configured to transmit and receive wireless signals through one or more antennas 2165 via RF front end 2188. In an aspect, transceiver may be tuned to operate at specified frequencies such that the UE 110 can communicate with, for example, one or more base stations 105 or one or more cells associated with one or more base stations 105. In an aspect, for example, modem 140 can configure transceiver 2102 to operate at a specified frequency and power level based on the UE configuration of the UE 110 and the communication protocol used by modem 140.

In an aspect, modem 140 can be a multiband-multimode modem, which can process digital data and communicate with transceiver 2102 such that the digital data is sent and received using transceiver 2102. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 2188, transceiver 2102) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 22:
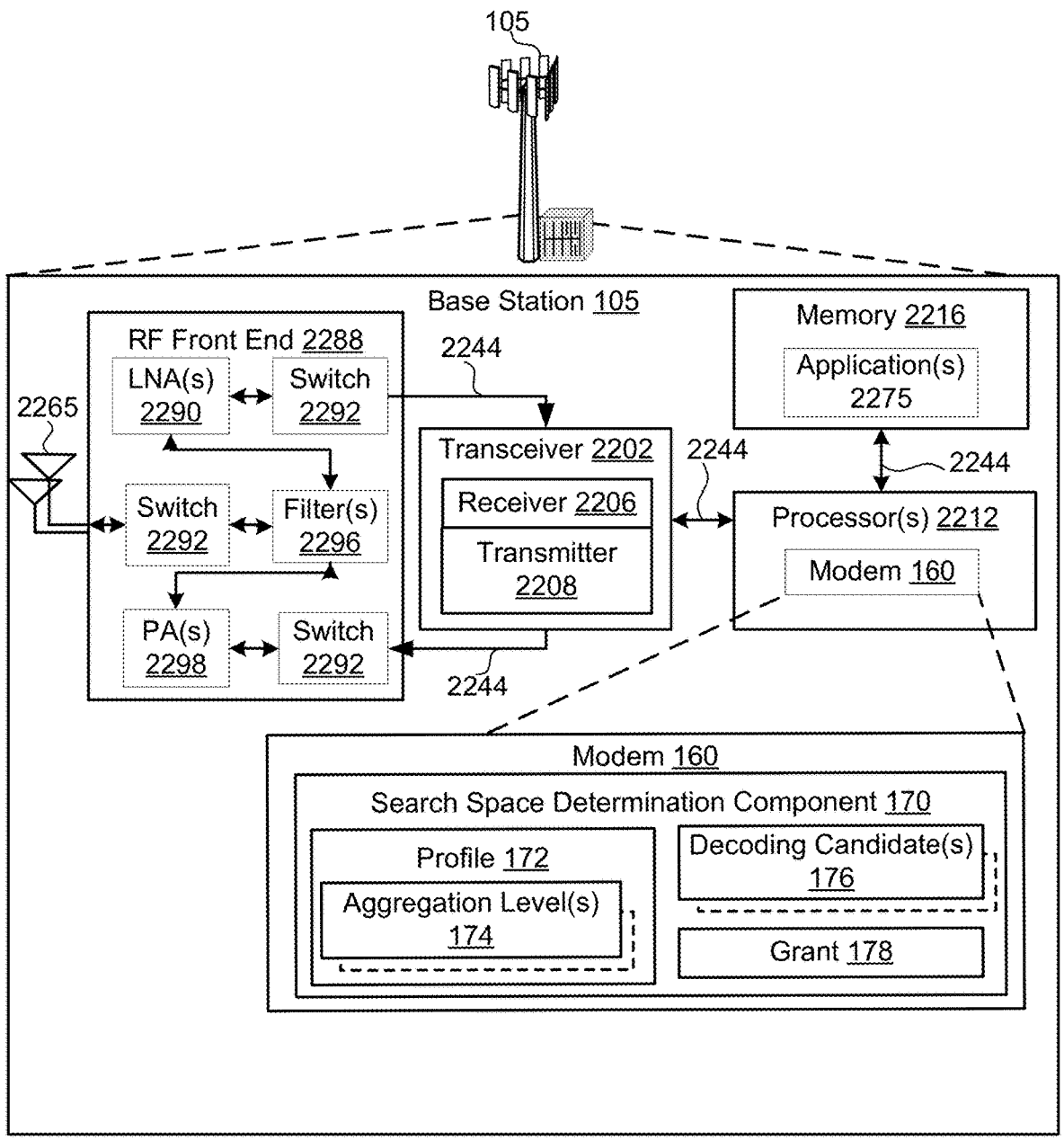
FIG. 22 is a schematic diagram of example components of the base station of FIG. 1.

Referring to FIG. 22, one example of an implementation of base station 105 may include a variety of components, some of which have already been described above, but including components such as one or more processors 2212, a memory 2216, and a transceiver 2202 in communication via one or more buses 2244, which may operate in conjunction with modem 160 and search space determination component 170 to enable one or more of the functions described herein relating to enhancing a UE's capability of performing channel estimation by using a binary tree based PDCCH search space to generate an aggregation level profile in a new radio environment.

The transceiver 2202, receiver 2206, transmitter 2208, one or more processors 2212, memory 2216, applications 2275, buses 2244, RF front end 2288, LNAs 2290, switches 2292, filters 2296, PAs 2298, and one or more antennas 2265 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication, comprising:
   identifying, at a user equipment (UE), an aggregation level profile having aggregation level profile values for a plurality of aggregation levels, wherein each aggregation level corresponds to a respective number of resources to use for decoding a physical downlink control channel (PDCCH), wherein the aggregation level profile includes at least one augmented node;
   determining one or more decoding candidates for the UE from among a plurality of available decoding candidates defined as nodes in a binary tree for a search space based on the aggregation level profile;
   determining respective control channel elements (CCEs) corresponding to each of the one or more decoding candidates, each respective CCE including one or more resource element groups (REGs); and
   performing channel estimation for each of the respective CCEs for use in demodulating and decoding downlink control information for the UE in the PDCCH, including performing one channel estimation per REG and sharing that channel estimation among different ones of the one or more decoding candidates sharing that REG.

2. The method of claim 1, wherein determining respective CCEs corresponding to each of the one or more decoding candidates further comprises determining sets of one or more adjacent CCEs.

3. The method of claim 1, further comprising:
   determining whether to bundle one or more CCEs of the respective CCEs based on a PDCCH boundary in the search space;
   bundling one or more CCEs of the respective CCEs based on a determination to bundle the one or more CCEs; and
   wherein performing channel estimation for each of the respective CCEs further comprises performing channel estimation for the one or more CCEs.

4. The method of claim 1, further comprising:
   determining whether to augment the aggregation level profile based on whether the aggregation level profile values for each of the plurality of aggregation levels represent nodes that fit within a hashing procedure on the binary tree to select respective nodes of the binary tree corresponding to the one or more decoding candidates;
   adjusting the aggregation level profile to include the at least one augmented node for at least one of the plurality of aggregation levels based on a determination to augment the aggregation level profile; and
   wherein determining the one or more decoding candidates for the search space using the binary tree is based on the aggregation level profile including the at least one augmented node.

5. The method of claim 1, wherein determining one or more decoding candidates for the UE from among the plurality of available decoding candidates further comprises performing a hashing procedure on the binary tree to select respective nodes of the binary tree corresponding to the one or more decoding candidates, wherein the hashing procedure utilizes a randomized seed associated with the UE.

6. The method of claim 1, further comprising:
   determining whether a total number of CCEs established by the aggregation level profile corresponds to a binary tree structure of the binary tree; and
   generating one or more additional CCEs to include within the binary tree structure of the binary tree based on a determination that the total number of CCEs does not correspond to the binary tree structure.

7. The method of claim 1, wherein determining respective CCEs corresponding to each of the one or more decoding candidates further comprises determining that at least some of the respective CCEs are sets of one or more non-adjacent CCEs.

8. The method of claim 5, wherein performing the hashing procedure on the binary tree further comprises:
   determining a root node of the nodes of the binary tree defining a control resource set based on the aggregation level profile;
   iteratively generating a random number value representing a branch direction from the root node down through one or more other nodes of the binary tree;
   determining whether a full profile set of nodes has been obtained for the one or more other nodes; and
   stopping the hashing procedure when the full profile set of nodes has been obtained.

9. The method of claim 6, further comprising adding the one or more additional CCEs to an end of the total number of CCEs, wherein the one or more additional CCEs are a subset of sequential CCEs obtained from a start of the total number of CCEs.

10. The method of claim 7, wherein determining the one or more decoding candidates further comprises:
    determining one or more island units for the search space based on the aggregation level profile, each island unit corresponding to at least a plurality of continuous REGs;
    determining whether a total number of the one or more island units corresponds to a binary tree structure of the binary tree; and
    performing a hashing procedure with the one or more island units on the search space using the aggregation level profile to obtain a full profile set of nodes based on a determination that the total number of the one or more island units corresponds to the binary tree structure.

11. The method of claim 8, further comprising receiving the randomized seed from a network entity, wherein iteratively generating the random number value further comprises iteratively generating the random number value based on the randomized seed, the randomized seed including one or more parameters to synchronize generation of the random number value by the UE and the network entity.

12. The method of claim 9, further comprising avoiding performing bundled channel estimation using at least a last one of the total number of CCEs and a first one of the one or more additional CCEs when the last one and the first one are discontinuous.

13. The method of claim 10, further comprising:
generating one or more additional island units to include within the binary tree structure of the binary tree based on a determination that the total number of the one or more island units does not correspond to the binary tree structure; and
wherein performing the hashing procedure further comprises performing the hashing procedure with the one or more island units and the one or more additional island units.

14. The method of claim 10, wherein each island unit corresponds to at least one of a REG bundle or one or more CCEs.

15. A user equipment (UE), comprising:
a memory; and
a processor in communication with the memory, wherein the processor is configured to:
identify an aggregation level profile having aggregation level profile values for a plurality of aggregation levels, wherein each aggregation level corresponds to a respective number of resources to use for decoding a physical downlink control channel (PDCCH), wherein the aggregation level profile includes at least one augmented node;
determine one or more decoding candidates for the UE from among a plurality of available decoding candidates defined as nodes in a binary tree for a search space based on the aggregation level profile;
determine respective control channel elements (CCEs) corresponding to each of the one or more decoding candidates, each respective CCE including one or more resource element groups (REGs); and
perform channel estimation for each of the respective CCEs for use in demodulating and decoding downlink control information for the UE in the PDCCH, including performing one channel estimation per REG and sharing that channel estimation among different ones of the one or more decoding candidates sharing that REG.

16. The UE of claim 15, wherein the processor configured to determine respective CCEs corresponding to each of the one or more decoding candidates is further configured to determine sets of one or more adjacent CCEs.

17. The UE of claim 15, wherein the processor is further configured to:
determine whether to bundle one or more CCEs of the respective CCEs based on a PDCCH boundary in the search space;
bundle one or more CCEs of the respective CCEs based on a determination to bundle the one or more CCEs; and
wherein the processor configured to perform channel estimation for each of the respective CCEs is further configured to perform channel estimation for the one or more CCEs.

18. The UE of claim 15, wherein the processor is further configured to:
determine whether to augment the aggregation level profile based on whether the aggregation level profile values for each of the plurality of aggregation levels represent nodes that fit within a hashing procedure on the binary tree to select respective nodes of the binary tree corresponding to the one or more decoding candidates;
adjust the aggregation level profile to include the at least one augmented node for at least one of the plurality of aggregation levels based on a determination to augment the aggregation level profile; and
wherein the processor is configured to determine the one or more decoding candidates for the search space using the binary tree based on the aggregation level profile including the at least one augmented node.

19. The UE of claim 15, wherein the processor configured to determine the one or more decoding candidates for the UE from among the plurality of available decoding candidates is further configured to perform a hashing procedure on the binary tree to select respective nodes of the binary tree corresponding to the one or more decoding candidates, wherein the hashing procedure utilizes a randomized seed associated with the UE.

20. The UE of claim 15, wherein the processor is further configured to:
determine whether a total number of CCEs established by the aggregation level profile corresponds to a binary tree structure of the binary tree; and
generate one or more additional CCEs to include within the binary tree structure of the binary tree based on a determination that the total number of CCEs does not correspond to the binary tree structure.

21. The UE of claim 15, wherein the processor configured to determine respective CCEs corresponding to each of the one or more decoding candidates is further configured to determine that at least some of the respective CCEs are sets of one or more non-adjacent CCEs.

22. The UE of claim 19, wherein the processor configured to perform the hashing procedure on the binary tree is further configured to:
determine a root node of the nodes of the binary tree defining a control resource set based on the aggregation level profile;
iteratively generate a random number value representing a branch direction from the root node down through one or more other nodes of the binary tree;
determine whether a full profile set of nodes has been obtained for the one or more other nodes; and
stop the hashing procedure when the full profile set of nodes has been obtained.

23. The UE of claim 20, wherein the processor is further configured to add the one or more additional CCEs to an end of the total number of CCEs, wherein the one or more additional CCEs are a subset of sequential CCEs obtained from a start of the total number of CCEs.

24. The UE of claim 21, wherein the processor configured to determine the one or more decoding candidates is further configured to:
determine one or more island units for the search space based on the aggregation level profile, each island unit corresponding to at least a plurality of continuous REGs;
determine whether a total number of the one or more island units corresponds to a binary tree structure of the binary tree; and
perform a hashing procedure with the one or more island units on the search space using the aggregation level profile to obtain a full profile set of nodes based on a determination that the total number of the one or more island units corresponds to the binary tree structure.

25. The UE of claim 22, wherein the processor is further configured to receive the randomized seed from a network entity, wherein the processor configured to iteratively generate the random number value is further configured to iteratively generate the random number value based on the randomized seed, the randomized seed including one or more parameters to synchronize generation of the random number value by the UE and the network entity.

26. The UE of claim 23, wherein the processor is further configured to avoid performing bundled channel estimation using at least a last one of the total number of CCEs and a first one of the one or more additional CCEs when the last one and the first one are discontinuous.

27. The UE of claim 24, wherein the processor is further configured to:
generate one or more additional island units to include within the binary tree structure of the binary tree based on a determination that the total number of the one or more island units does not correspond to the binary tree structure; and
wherein the processor configured to perform the hashing procedure is further configured to perform the hashing procedure with the one or more island units and the one or more additional island units.

28. The UE of claim 24, wherein each island unit corresponds to at least one of a REG bundle or one or more CCEs.

29. A user equipment (UE), comprising:
means for identifying an aggregation level profile having aggregation level profile values for a plurality of aggregation levels, wherein each aggregation level corresponds to a respective number of resources to use for decoding a physical downlink control channel (PDCCH), wherein the aggregation level profile includes at least one augmented node;
means for determining one or more decoding candidates for the UE from among a plurality of available decoding candidates defined as nodes in a binary tree for a search space based on the aggregation level profile;
means for determining respective control channel elements (CCEs) corresponding to each of the one or more decoding candidates, each respective CCE including one or more resource element groups (REGs); and
means for performing channel estimation for each of the respective CCEs for use in demodulating and decoding downlink control information for the UE in the PDCCH, including performing one channel estimation per REG and sharing that channel estimation among different ones of the one or more decoding candidates sharing that REG.

30. A non-transitory computer-readable medium storing computer code executable by a processor for wireless communications, comprising:
code for identifying, at a user equipment (UE), an aggregation level profile having aggregation level profile values for a plurality of aggregation levels, wherein each aggregation level corresponds to a respective number of resources to use for decoding a physical downlink control channel (PDCCH), wherein the aggregation level profile includes at least one augmented node;
code for determining one or more decoding candidates for the UE from among a plurality of available decoding candidates defined as nodes in a binary tree for a search space based on the aggregation level profile;
code for determining respective control channel elements (CCEs) corresponding to each of the one or more decoding candidates, each respective CCE including one or more resource element groups (REGs); and
code for performing channel estimation for each of the respective CCEs for use in demodulating and decoding downlink control information for the UE in the PDCCH, including performing one channel estimation per REG and sharing that channel estimation among different ones of the one or more decoding candidates sharing that REG.

* * * * *